United States Patent
Koike et al.

(10) Patent No.: US 8,390,159 B2
(45) Date of Patent: Mar. 5, 2013

(54) STATOR FOR ELECTRIC ROTATING MACHINE

(75) Inventors: Akihito Koike, Kariya (JP); Mitsuru Katoh, Anjo (JP); Masashi Yoshida, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 149 days.

(21) Appl. No.: 13/010,077

(22) Filed: Jan. 20, 2011

(65) Prior Publication Data
US 2011/0175483 A1  Jul. 21, 2011

(30) Foreign Application Priority Data
Jan. 21, 2010  (JP) ................................ 2010-011042

(51) Int. Cl.
   *H02K 17/00* (2006.01)
(52) U.S. Cl. ......................................... 310/71; 310/260
(58) Field of Classification Search ................. 310/71, 310/201–208, 260
   See application file for complete search history.

(56) References Cited

U.S. PATENT DOCUMENTS

| | | | |
|---|---|---|---|
| 6,201,332 B1 * | 3/2001 | Umeda et al. | 310/184 |
| 8,030,812 B2 * | 10/2011 | Tanaka et al. | 310/71 |
| 2009/0200888 A1 * | 8/2009 | Tanaka et al. | 310/195 |
| 2011/0012472 A1 | 1/2011 | Umeda et al. | |

FOREIGN PATENT DOCUMENTS

JP  2009-219343  9/2009

OTHER PUBLICATIONS

U.S. Appl. No. 12/837,724, Atsushi Umeda et al., dated Jul. 16, 2010.

* cited by examiner

*Primary Examiner* — Dang Le
(74) *Attorney, Agent, or Firm* — Nixon & Vanderhye P.C.

(57) ABSTRACT

A stator includes a stator coil formed of electric wires which include a joined pair of first and second electric wires. The first electric wire has a lead portion led out from the radially inner periphery of a first slot of a stator core and including a crossover part. The crossover part crosses over an axial end face of an end part of the stator coil from the radially inside to the radially outside of the axial end face; the end part protrudes from an axial end face of the stator core. The second electric wire has a lead portion led out from the radially outer periphery of a second slot of the stator core. The lead portions of the electric wires are joined together with a joint formed therebetween. The joint is positioned closer to the axial end face of the stator core than the crossover part is.

10 Claims, 21 Drawing Sheets

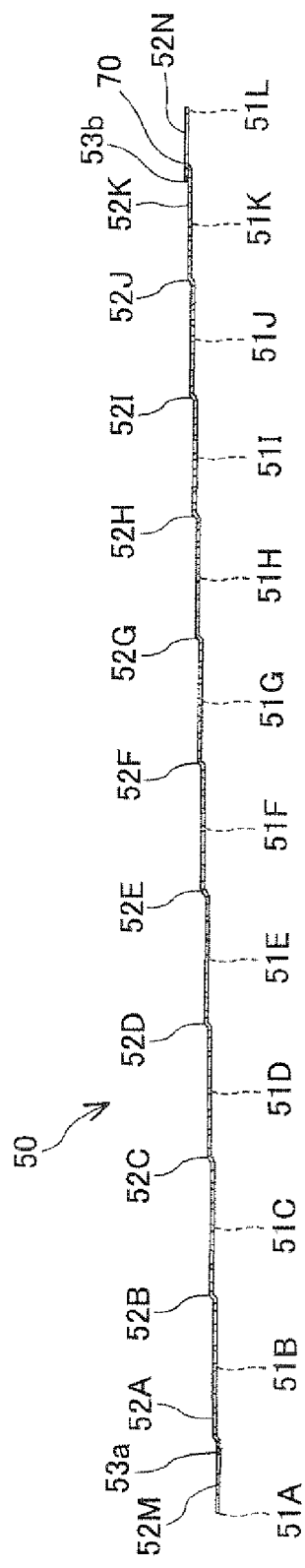
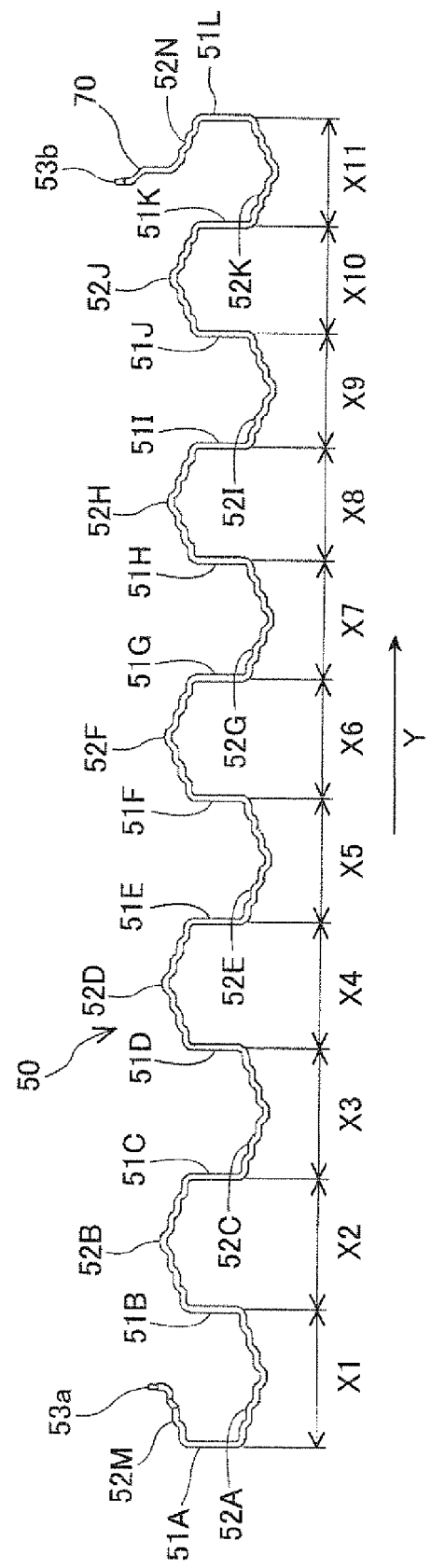

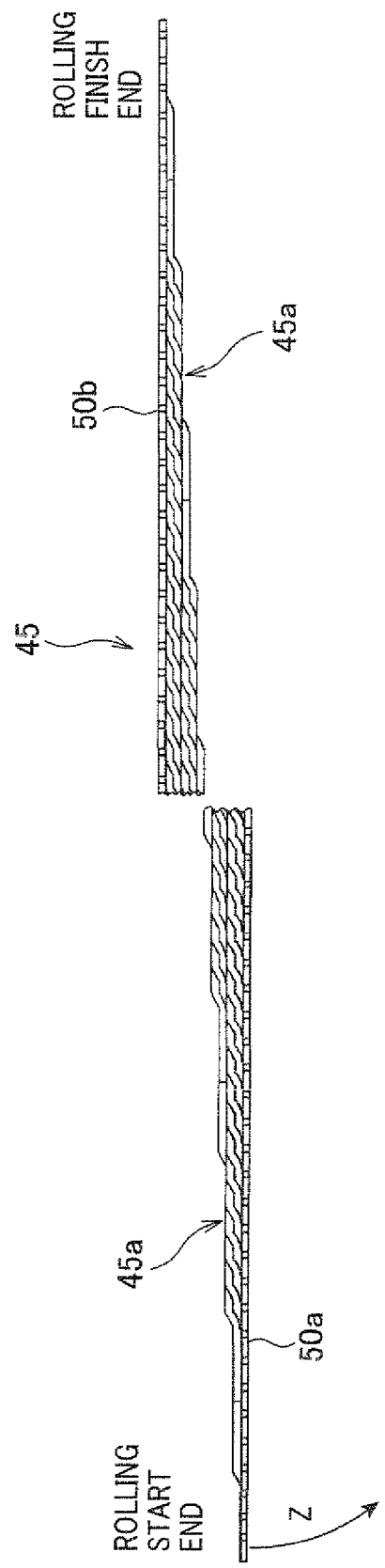

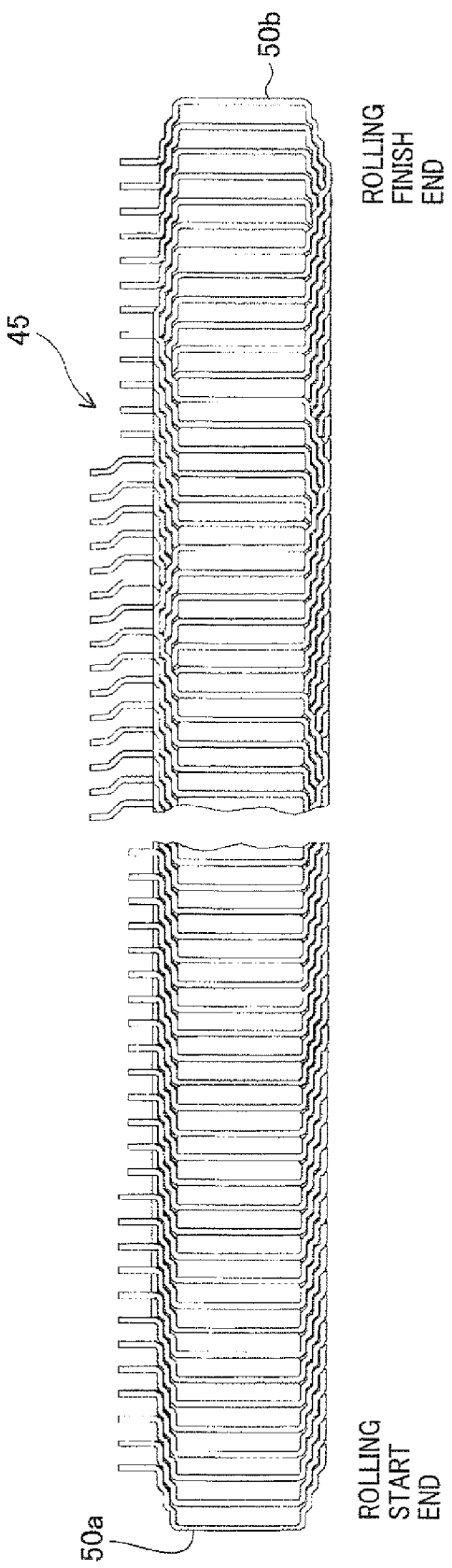

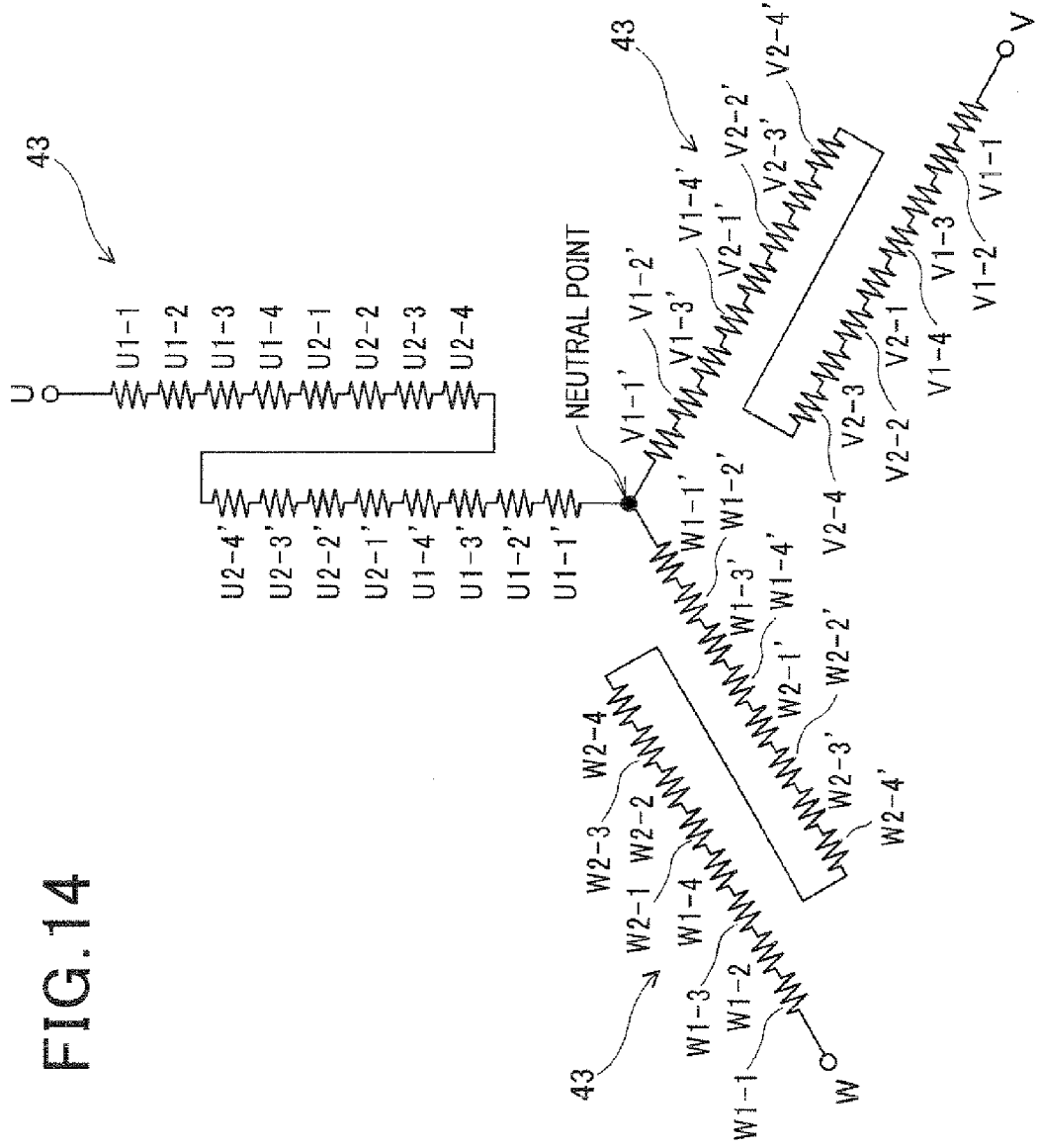

FIG. 17

| SLOT NUMBER | OUTERMOST LAYER | INNERMOST LAYER |
|---|---|---|
| 1 | U1-1 | U1-3' |
| 2 | U2-1 | U2-3' |
| 3 | W1-1' | W1-3 |
| 4 | W2-1' | W2-3 |
| 5 | V1-1 | V1-3' |
| 6 | V2-1 | V2-3' |
| 7 | U1-1' | U1-4 |
| 8 | U2-1' | U2-4 |
| 9 | W1-1 | W1-4' |
| 10 | W2-1 | W2-4' |
| 11 | V1-1' | V1-4 |
| 12 | V2-1' | V2-4 |
| 13 | U1-2 | U1-4' |
| 14 | U2-2 | U2-4' |
| 15 | W1-2' | W1-4 |
| 16 | W2-2' | W2-4 |
| 17 | V1-2 | V1-4' |
| 18 | V2-2 | V2-4' |
| 19 | U1-2' | U1-1 |
| 20 | U2-2' | U2-1 |
| 21 | W1-2 | W1-1' |
| 22 | W2-2 | W2-1' |
| 23 | V1-2' | V1-1 |
| 24 | V2-2' | V2-1 |

| SLOT NUMBER | OUTERMOST LAYER | INNERMOST LAYER |
|---|---|---|
| 25 | U1-3 | U1-1' |
| 26 | U2-3 | U2-1' |
| 27 | W1-3' | W1-1 |
| 28 | W2-3' | W2-1 |
| 29 | V1-3 | V1-1' |
| 30 | V2-3 | V2-1' |
| 31 | U1-3' | U1-2 |
| 32 | U2-3' | U2-2 |
| 33 | W1-3 | W1-2' |
| 34 | W2-3 | W2-2' |
| 35 | V1-3' | V1-2 |
| 36 | V2-3' | V2-2 |
| 37 | U1-4 | U1-2' |
| 38 | U2-4 | U2-2' |
| 39 | W1-4' | W1-2 |
| 40 | W2-4' | W2-2 |
| 41 | V1-4 | V1-2' |
| 42 | V2-4 | V2-2' |
| 43 | U1-4' | U1-3 |
| 44 | U2-4' | U2-3 |
| 45 | W1-4 | W1-3' |
| 46 | W2-4 | W2-3' |
| 47 | V1-4' | V1-3 |
| 48 | V2-4' | V2-3 |

STATOR FOR ELECTRIC ROTATING MACHINE

CROSS-REFERENCE TO RELATED APPLICATION

This application is based on and claims priority from Japanese Patent Application No. 2010-11042, filed on Jan. 21, 2010, the content of which is hereby incorporated by reference in its entirety into this application.

BACKGROUND OF THE INVENTION

1. Technical Field of the Invention

The present invention relates to stators for electric rotating machines that are used in, for example, motor vehicles as electric motors and electric generators.

2. Description of the Related Art

Conventionally, there are known stators for electric rotating machines which include a hollow cylindrical stator core and a stator coil mounted on the stator core.

The stator core has a plurality of slots that are formed in the radially inner surface of the stator core and spaced in the circumferential direction of the stator core. The stator coil is formed by joining a plurality of electric wires. Each of the electric wires includes a plurality of in-slot portions, each of which is received in a corresponding one of the slots of the stator core, and a plurality of turn portions each of which connects an adjacent pair of the in-slot portions and is located outside the slots of the stator core.

Moreover, each corresponding pair of the electric wires forming the stator coil may be joined together by, for example, a method disclosed in Japanese Patent Application Publication No. 2009-219343. According to the method, for each corresponding pair of the electric wires, one of the electric wires has an end portion led out from the radially inner periphery of one slot of the stator core, while the other electric wire has an end portion led out from the radially outer periphery of another slot of the stator core. The end portions of the electric wires are joined together at a position above a coil end part of the stator coil which is located outside the slots of the stator core.

Furthermore, each of the electric wires forming the stator coil is generally comprised of an electric conductor and an insulating coat that covers the outer surface of the electric conductor. In joining each corresponding pair of the electric wires, the insulating coats are first stripped from both the end portions of the electric wires. Then, the stripped end portions of the electric wires are welded together, forming a joint (i.e., weld) therebetween. Thereafter, an insulating material (e.g., a powder resin) is applied to form an insulating layer that covers both the stripped end portions of the electric wires.

However, the thus-formed insulating layer is weaker than the insulating coats of the electric wires which are formed on the electric conductors in the manufacture of the electric wires; therefore, it is easier for the insulating layer to be peeled off from the electric wires than the insulating coats.

Consequently, referring to FIG. 21, when the joint 50B between the electric wires 50A interferes with the inner surface of a housing 10 of the electric rotating machine after mounting the stator in the housing 10, the insulating layer 50C may become peeled off from the joint 50B, resulting in an insulation failure of the joint 50B.

SUMMARY OF THE INVENTION

According to the present invention, there is provided a stator for an electric rotating machine. The stator includes a hollow cylindrical stator core and a stator coil. The stator core has a plurality of slots that are formed in the radially inner surface of the stator core and spaced in the circumferential direction of the stator core. The stator coil is formed of a plurality of electric wires mounted on the stator core. The electric wires forming the stator coil include a joined pair of first and second electric wires. The first electric wire has a lead portion that is led out from the radially inner periphery of a first one of the slots of the stator core and includes a crossover part. The crossover part crosses over an axial end face of an end part of the stator coil from the radially inside to the radially outside of the axial end face. The end part of the stator coil protrudes from an axial end face of the stator core. The second electric wire has a lead portion that is led out from the radially outer periphery of a second one of the slots of the stator core. The lead portions of the first and second electric wires are joined together with a joint formed therebetween. The joint is positioned closer to the axial end face of the stator core than the crossover part of the lead portion of the first electric wire is.

With the above configuration, when the stator is received in a housing of the electric rotating machine, the joint will not interfere with the inner surface of the housing because the inner surface will first interfere with the crossover part. Consequently, it is possible to prevent an insulating layer, which may be formed after the joining of the first and second electric wires to cover the joint, from being peeled off from the joint, thereby ensuring electrical insulation of the joint.

In a further implementation of the invention, the distance between the joint and the axial end face of the stator core in the axial direction of the stator core is shorter than the maximum distance between the crossover part and the axial end face of the stator core in the axial direction.

The lead portion of the first electric wire further includes a bent part which adjoins the crossover part and at which the lead portion is bent radially outward.

The bending-start end of the bent part is positioned more axially outward than the axial end face of the end part of the stator coil by a first predetermined distance.

The crossover part of the lead portion of the first electric wire extends obliquely with respect to the axial end face of the stator core so that a joint-side end of the crossover part is located closer to the axial end face of the stator core than a bent part-side end of the crossover part is.

The joint-side end of the crossover part is positioned more axially outward than the axial end face of the end part of the stator coil by a second predetermined distance.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 11A is a top view of one of the electric wires;

FIG. 11B is a front view of the one of the electric wires;

FIG. 13A is a bottom view of an electric wire assembly comprised of the electric wires for forming the stator coil;

FIG. 13B is a front view of the electric wire assembly;

FIG. 14 is a circuit diagram of the stator coil;

FIG. 17 is a tabular representation showing both the number of the electric wire located at the radially outermost layer and the number of the electric wire located at the radially innermost layer in each of the slots of the stator core;

DESCRIPTION OF PREFERRED EMBODIMENT

Figure 1:
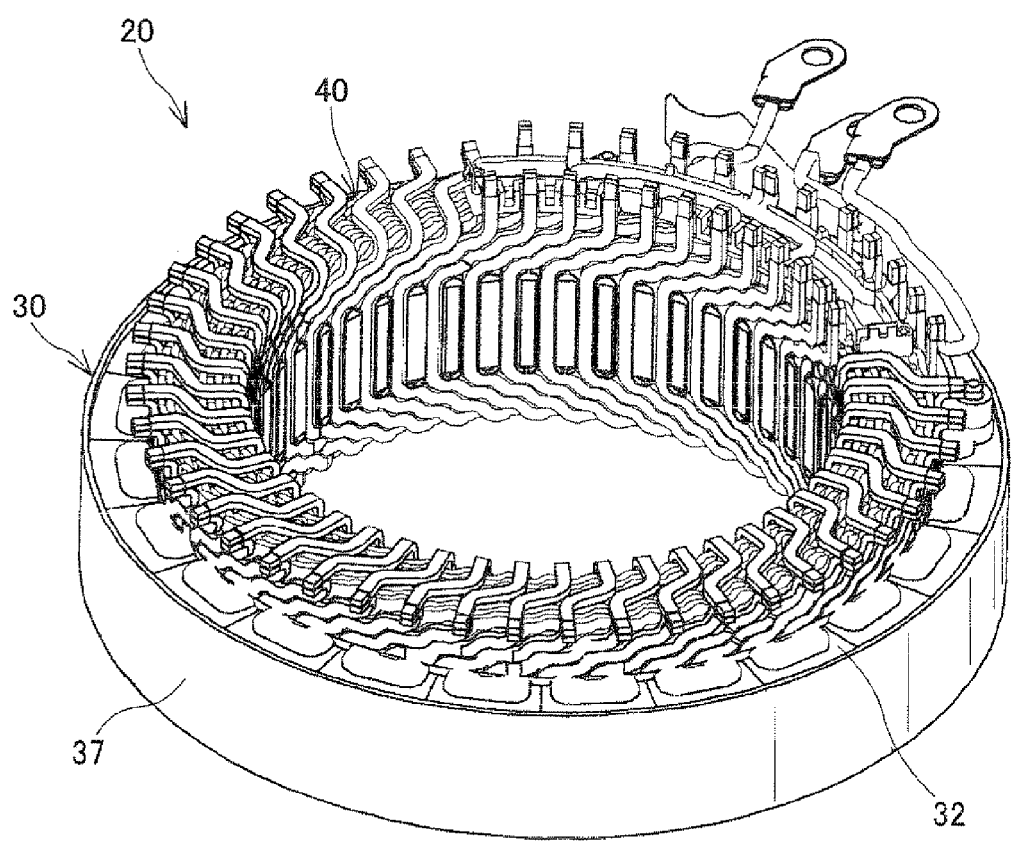
FIG. 1 is a perspective view showing the overall configuration of a stator for an electric rotating machine according to an embodiment of the invention.
Figure 2:
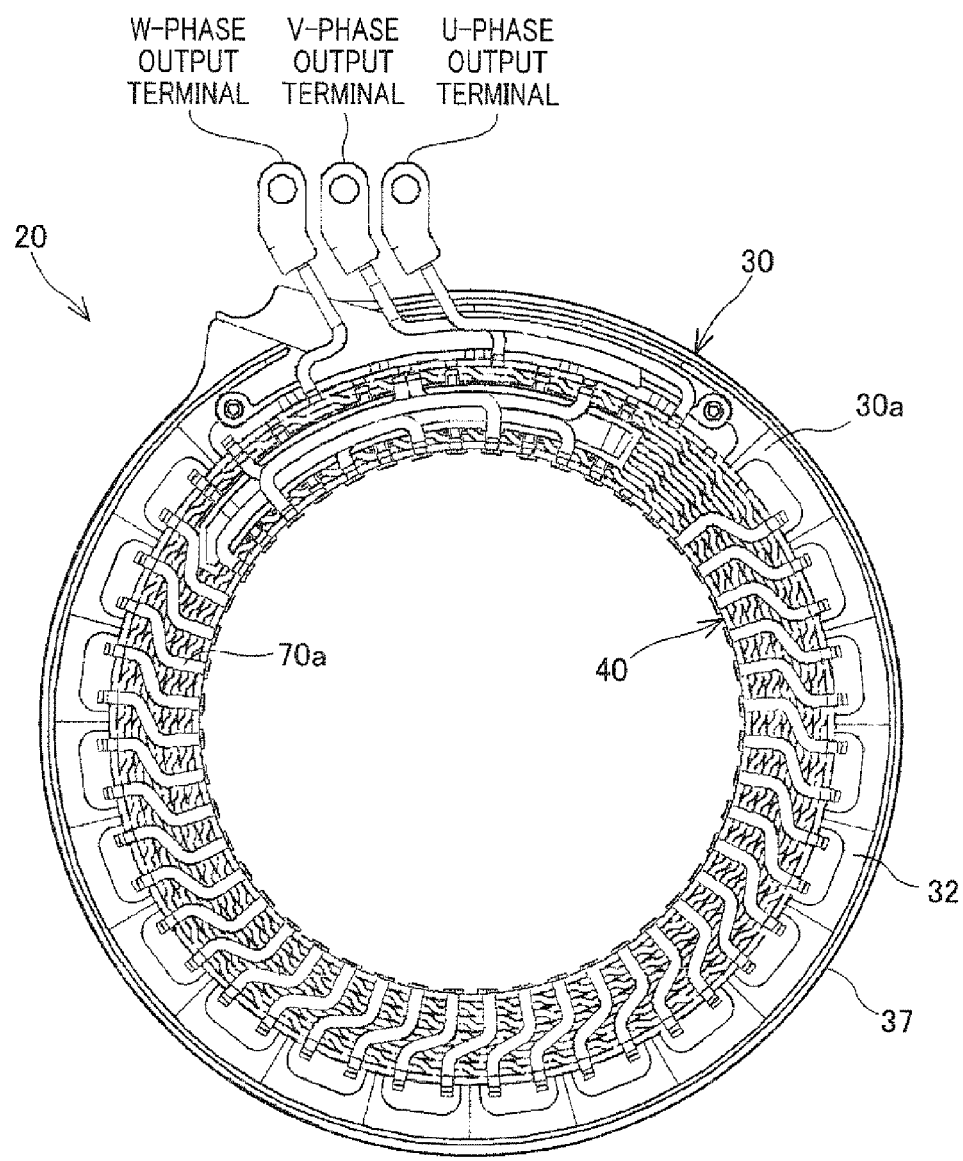
FIG. 2 is a top view of the stator.
Figure 3:
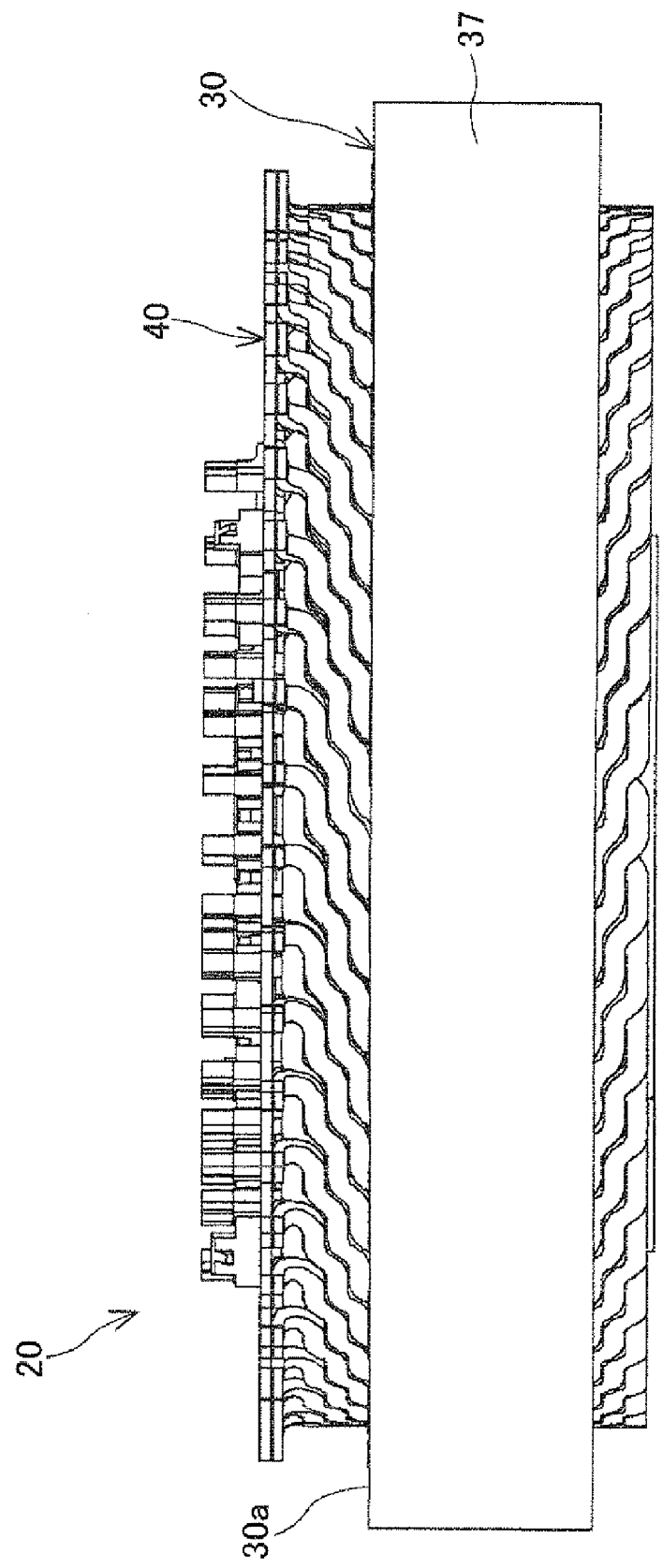
FIG. 3 is a side view of the stator.

FIGS. 1-3 together show the overall configuration of a stator 20 according to an embodiment of the invention.

The stator 20 is designed for use in, for example, an electric rotating machine which is configured to function both as an electric motor and as an electric generator in a motor vehicle. The electric rotating machine further includes a rotor (not shown) that is rotatably disposed so as to be surrounded by the stator 20. The rotor includes a plurality of permanent magnets that form a plurality of magnetic poles on a radially outer periphery of the rotor to face a radially inner periphery of the stator. The polarities of the magnetic poles alternate between north and south in the circumferential direction of the rotor. In addition, in the present embodiment, the number of the magnetic poles formed in the rotor is equal to eight (i.e., four north poles and four south poles).

As shown in FIGS. 1-3, the stator 20 includes a hollow cylindrical stator core 30 and a three-phase stator coil 40 that is comprised of a plurality of (e.g., 48 in the present embodiment) electric wires 50 mounted on the stator core 30. In addition, the stator 20 may further include insulating paper interposed between the stator core 30 and the stator coil 40.

Figure 4:
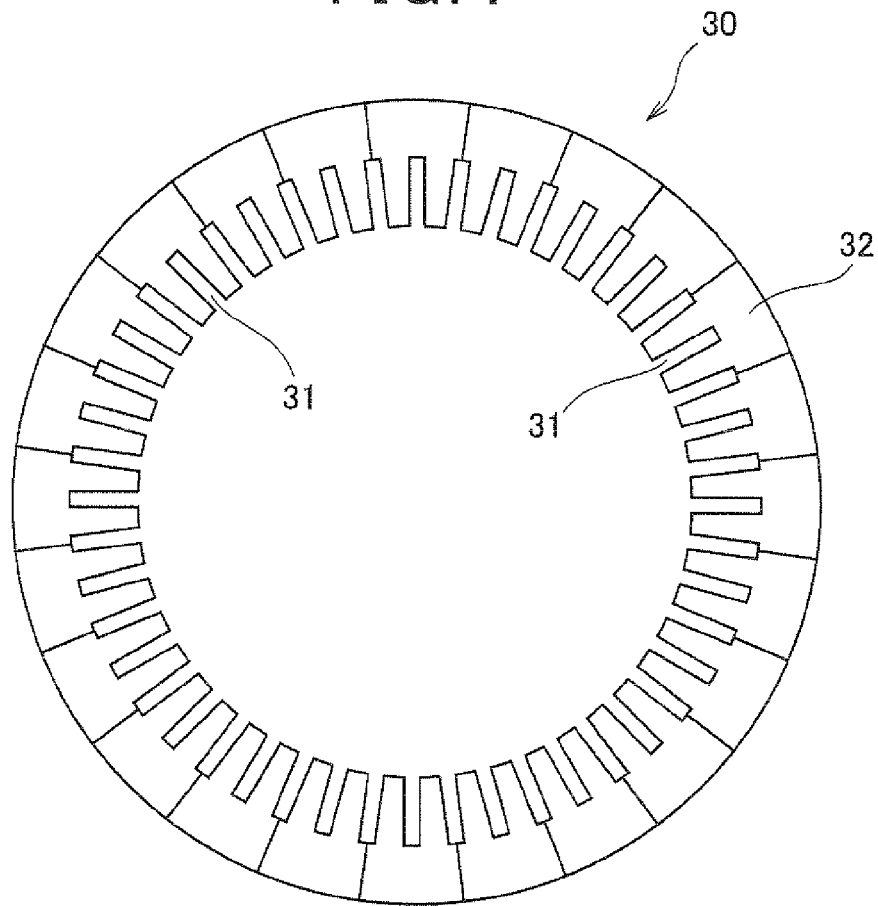
FIG. 4 is a top view of a stator core of the stator.

The stator core 30 has, as shown in FIG. 4, a plurality of slots 31 that are formed in the radially inner surface of the stator core 30 and spaced in the circumferential direction of the stator core 30 at a predetermined pitch. For each of the slots 31, the depth-wise direction of the slot 31 is coincident with a radial direction of the stator core 30. In the present embodiment, there are provided two slots 31 per magnetic pole of the rotor that has the eight magnetic poles and per phase of the three-phase stator coil 40. Accordingly, the total number of the slots 31 provided in the stator core 30 is equal to 48 (i.e., 2×8×3).

Figure 5:
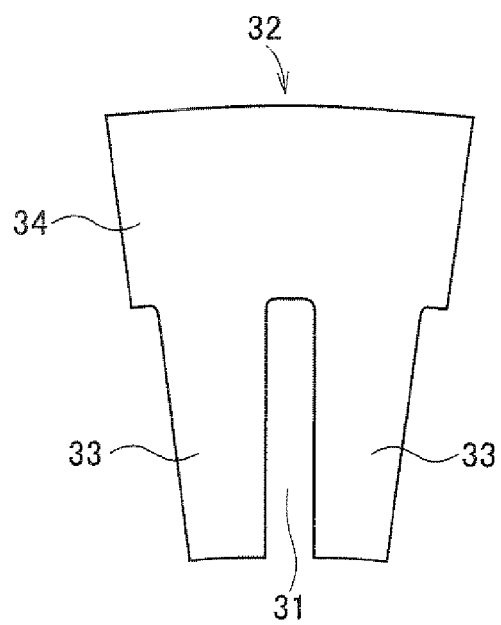
FIG. 5 is a top view of one of stator core segments which together make up the stator core.

Moreover, in the present embodiment, the stator core 30 is made up of, for example, 24 stator core segments 32 as shown in FIG. 5. The stator core segments 32 are joined together so as to adjoin one another in the circumferential direction of the stator core 30. Each of the stator core segments 32 defines therein one of the slots 31. Further, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is located radially outward of the tooth portions 33 to connect them. In addition, on the radially outer surfaces of the stator core segments 32, there is fitted a cylindrical outer rim 37 (see FIGS. 1-3).

In the present embodiment, each of the stator core segments 32 is formed by laminating a plurality of magnetic steel sheets with a plurality of insulating films interposed therebetween. It should be noted that other conventional metal sheets may also be used instead of the magnetic steel sheets.

FIGS. 6-9 together show the configuration of the stator coil 40. In the present embodiment, as to be described later, the stator coil 40 is produced by first stacking the 48 electric wires 50 to form a band-shaped electric wire assembly 45 as shown in FIGS. 13A-13B and then rolling the electric wire assembly 45 into a hollow cylindrical shape.

As shown in FIGS. 6-9, the stator coil 40 has, as a whole, a straight part 41 to be received in the slots 31 of the stator core 30, and a pair of coil end parts 42 that are respectively formed on opposite axial sides of the straight part 41 and to be located outside the slots 31. Moreover, on one axial side of the straight part 41, U-phase, V-phase, and W-phase output terminals and U-phase, V-phase, and W-phase neutral terminals of the stator coil 40 protrude from the annular axial end face of the coil end part 42, and a plurality of crossover parts 70 of the electric wires 50 cross over the axial end face from the radially inner side to the radially outer side of the axial end face to connect corresponding pairs of the electric wires 50.

Figure 10A:
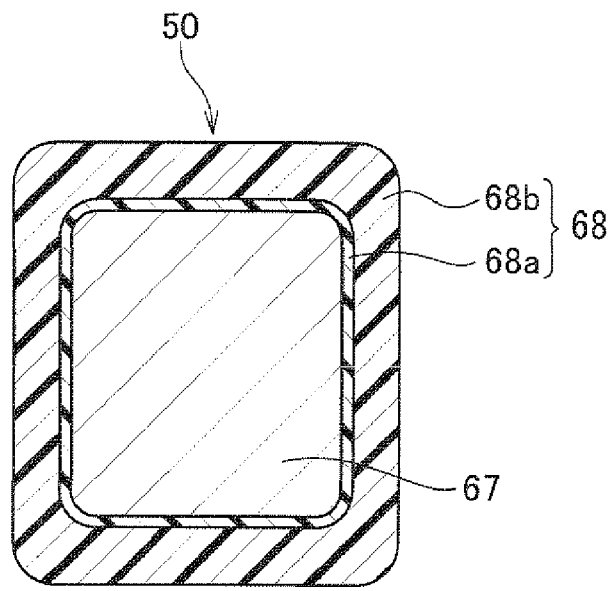
FIG. 10A is a cross-sectional view illustrating the configuration of electric wires forming the stator coil.

Each of the electric wires 50 for forming the stator coil 40 is configured with, as shown in FIG. 10A, an electric conductor 67 and an insulating coat 68 that covers the outer surface of the electric conductor 67. In the present embodiment, the electric conductor 67 is made of copper and has a substantially rectangular cross section. The insulating coat 68 is two-layer structured to include an inner layer 68a and an outer layer 68b. The thickness of the insulating coat 68 (i.e., the sum of thicknesses of the inner and outer layers 68a and 68b) is set to be in the range of 100 to 200 μm.

With such a large thickness of the two-layer structured insulating coat 68, it is possible to reliably insulate the electric wires 50 from one another without interposing insulating paper therebetween. However, it is also possible to interpose insulating paper between the electric wires 50 so as to further enhance the electrical insulation therebetween.

Further, the outer layer 68b is made of an insulating material such as nylon. The inner layer 68a is made of a thermoplastic resin having a higher glass transition temperature than the outer layer 68b or an insulating material having no glass transition temperature such as a polyamide-imide resin. Consequently, the outer layers 68b of the electric wires 50 will be solidified by the heat generated by operation of the electric rotating machine earlier than the inner layers 68a. As a result, the surface hardness of the outer layers 68b will be increased, thereby enhancing the electrical insulation between the electric wires 50.

Figure 10B:
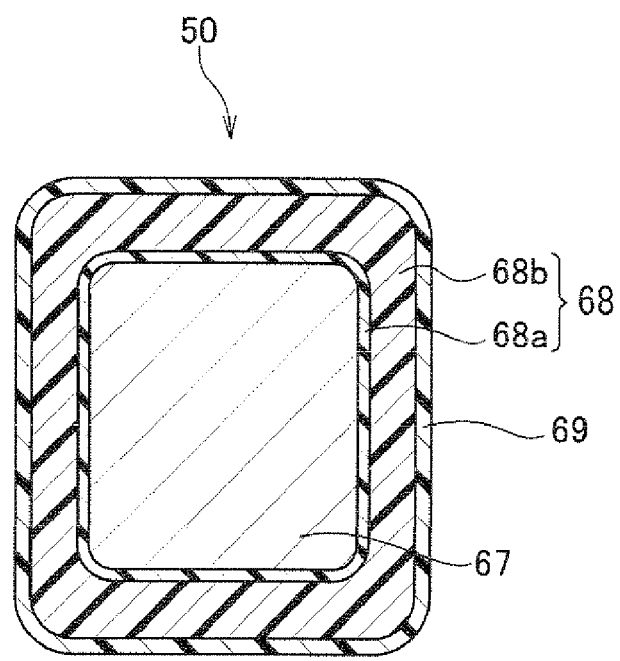
FIG. 10B is a cross-sectional view illustrating a modification of the configuration of the electric wires shown in FIG. 10A.

Furthermore, as shown in FIG. 10B, it is also possible for each of the electric wires 50 to further include a fusible coat 69 to cover the outer surface of the insulating coat 68; the fusible coat 69 may be made, for example, of epoxy resin. In this case, the fusible coats 69 of the electric wires 50 will be fused by the heat generated by operation of the electric rotating machine earlier than the insulating coats 68, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 68b of the insulating coats 68 of the electric wires 50 may also be made of PPS (polyphenylene sulfide).

FIGS. 11A-11B together show the shape of each of the electric wires 50 before the electric wires 50 are stacked to form the band-shaped electric wire assembly 45.

As shown in FIGS. 11A-11B, each of the electric wires 50 is wave-shaped to include a plurality of in-slot portions 51 and a plurality of turn portions 52. The in-slot portions 51 are spaced in the longitudinal direction Y of the electric wire 50 at predetermined pitches and extend perpendicular to the longitudinal direction Y. Each of the in-slot portions 51 is to be received in a corresponding one of the slots 31 of the stator core 30. Each of the turn portions 52 extends to connect a corresponding adjacent pair of the in-slot portions 51 and is to be located outside the slots 31 of the stator core 30.

Specifically, the plurality of in-slot portions 51 include, at least, a first in-slot portion 51A, a second in-slot portion 51B, and a third in-slot portion 51C. The first, second and third in-slot portions 51A, 51B, and 51C are to be respectively received in three different slots 31 of the stator core 30; the three slots 31 are circumferentially spaced at a pitch of six slots 31. On the other hand, the plurality of turn portions 52 include, at least, a first turn portion 52A and a second turn portion 52B. The first turn portion 52A connects the first and second in-slot portions 51A and 5113 and is to be located on one axial side of the stator core 30 outside the slots 31. The second turn portion 52B connects the second and third in-slot portions 51B and 51C and is to be located on the other axial side of the stator core 30 outside the slots 31.

More specifically, in the present embodiment, as shown in FIGS. 11A-11B, the plurality of in-slot portions 51 include first to twelfth in-slot portions 51A-51L which are to be sequentially received in eight slots 31 that are circumferentially spaced at a pitch of six slots 31. In other words, the number of the in-slot portions 51 in each of the electric wires 50 is equal to 12. On the other hand, the plurality of turn portions 52 include first to eleventh turn portions 52A-52K which each connect a corresponding adjacent pair of the in-slot portions 51A-51L and are to be alternately located on the opposite axial sides of the stator core 30 outside the slots 31. In other words, the number of the turn portions 52 in each of the electric wires 50 is equal to 11.

Moreover, the predetermined pitches X between the in-slot portions 51A-51L in the longitudinal direction Y of the electric wire 50 gradually decrease in a direction from the first in-slot portion 51A to the twelfth in-slot portion 51L. That is, X1>X2>X3>X4>X5>X6>X7>X8>X9>X10>X11. In addition, the predetermined pitches X1-X11 are set based on the circumferential distances between the eight slots 31 of the stator core 30 in which the in-slot portions 51A-51L are to be received.

Each of the electric wires 50 further includes a pair of lead portions 53a and 53b that are respectively formed at opposite ends of the electric wire 50 for connecting the electric wire 50 with other electric wires 50. The lead portion 53a is connected to the first in-slot portion 51A via a half-turn portion 52M that extends from the first in-slot portion 51A to return inward (i.e., rightward in FIG. 11B) in the longitudinal direction Y of the electric wire 50. The length of the half-turn portion 52M is substantially half the length of the first turn portion 52A. Consequently, the lead portion 53a is offset inward (i.e., rightward in FIG. 11B) in the longitudinal direction Y from the first in-slot portion 51A by the length of the half-turn portion 52M. On the other hand, the lead portion 53b is connected to the twelfth in-slot portion 51L via a half-turn portion 52N that extends from the twelfth in-slot portion 51L to return inward (i.e., leftward in FIG. 11B) in the longitudinal direction Y of the electric wire 50. The length of the half-turn portion 52N is substantially half the length of the eleventh turn portion 52K. Consequently, the lead portion 53b is offset inward (i.e., leftward in FIG. 11B) in the longitudinal direction Y from the twelfth in-slot portion 51L by the length of the half-turn portion 52N. Further, the lead portion 53b is formed to include therein one of the crossover parts 70 described previously.

Furthermore, as shown in FIG. 11A, each of the turn portions 52 includes, substantially at the center thereof, a crank-shaped part 54 that is bent to offset the turn portion 52 in a direction perpendicular to both the longitudinal direction Y of the electric wire 50 and the extending direction of the in-slot portions 51. Consequently, with the crank-shaped parts 54, the electric wire 50 is stepped to successively offset the in-slot portions 51 in the direction perpendicular to both the longitudinal direction Y and the extending direction of the in-slot portions 51. It should be noted that the term "crank-shaped" is used here only for the purpose of describing the overall shape of the parts 54 and does not restrict the internal angles between adjacent sections of the parts 54 to 90°.

Figure 12A:
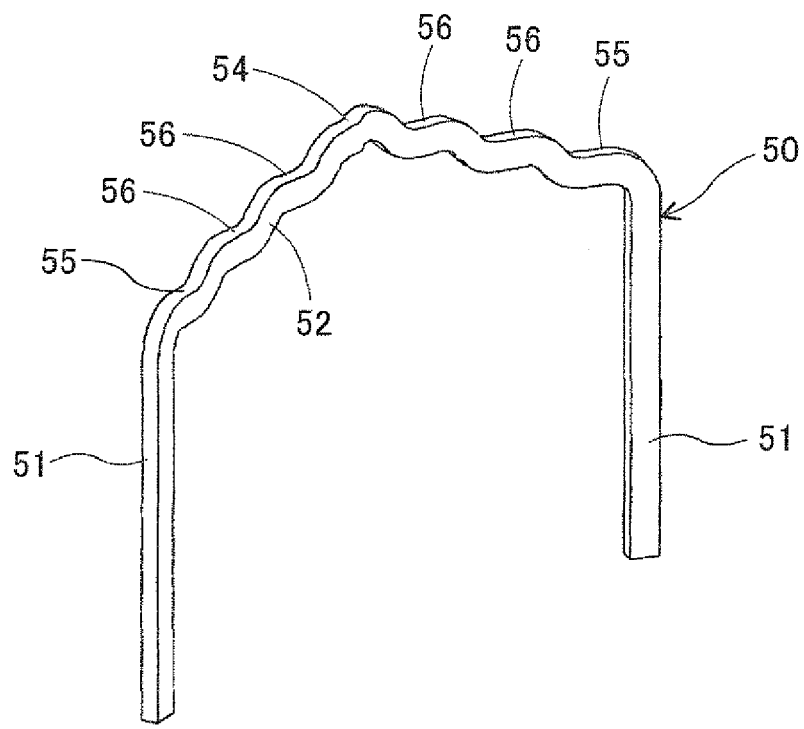
FIG. 12A is a perspective view illustrating a turn portion of one of the electric wires.
Figure 12B:
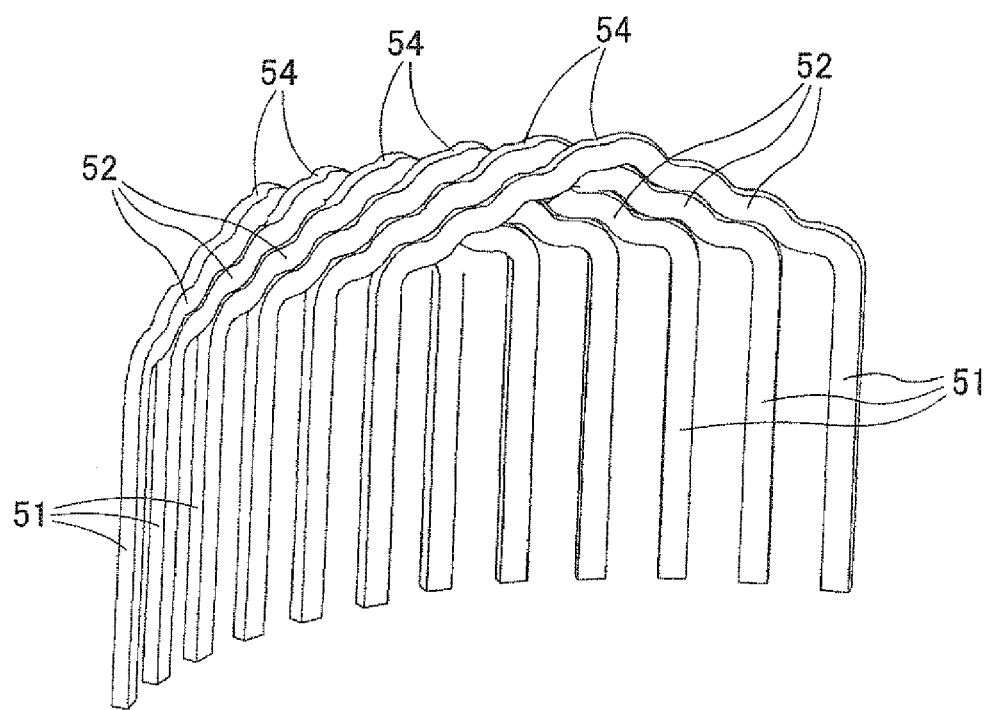
FIG. 12B is a perspective view illustrating a plurality of turn portions of the electric wires which are adjacent to one another.

Referring now to FIGS. 12A-12B, after forming the stator coil 40 with the electric wires 50 and assembling the stator core 30 to the stator coil 40, each of the turn portions 52 (i.e., 52A-52K) of the electric wires 50 is offset by the crank-shaped part 54 formed therein in a radial direction of the stator core 30. In addition, though not shown in FIGS. 12A-12B, each of the crank-shaped parts 54 formed in the turn portions 52 of the electric wires 50 extends parallel to a corresponding axial end face 30a of the stator core 30.

Further, in the present embodiment, the amount of radial offset made by each of the crank-shaped parts 54 is set to be equal to the radial thickness of the in-slot portions 51 of the electric wires 50. Here, the amount of radial offset made by each of the crank-shaped parts 54 is defined as the difference in radial position between the opposite ends of the crank-shaped part 54. Accordingly, for each of the electric wires 50, the difference in radial position between each adjacent pair of the in-slot portions 51, which are connected by a corresponding one of the turn portions 52, is equal to the radial thickness (i.e., thickness in the radial direction of the stator core 30) of the in-slot portions 51.

Setting the amount of radial offset as above, it is possible to arrange each adjacent pair of the turn portions 52 of the electric wires 50 in intimate contact with each other, as shown in FIG. 12B. As a result, the radial thickness of the coil end parts 42 of the stator coil 40 can be minimized. In addition, it is also possible to make each adjacent pair of the turn portions 52 of the electric wires 50 extend in the circumferential direction of the stator core 30 without interference therebetween.

Moreover, as shown in FIGS. 12A-12B, each of the turn portions 52 of the electric wires 50 includes a pair of shoulder parts 55 which respectively adjoin the pair of the in-slot portions connected by the turn portion 52 and both extend perpendicular to the pair of the in-slot portions 51 (or parallel to the corresponding axial end face 30a of the stator core 30). Consequently, with the shoulder parts 55, the protruding height of each of the turn portions 52 from the corresponding axial end face 30a of the stator core 30 can be reduced. As a result, the axial length of the coil end parts 42 of the stator coil 40 can be reduced. In addition, the coil end parts 42 of the stator coil 40 are each comprised of those of the turn portions 52 of the electric wires 50 which are located on the same axial side of the stator core 30.

Further, in the present embodiment, there is specified the following dimensional relationship: $d1 \leq d2$, where $d1$ is the length of each of the shoulder parts 55 of the electric wires 50 in the circumferential direction of the stator core 30 and $d2$ is the distance between each circumferentially-adjacent pair of the slots 31 of the stator core 30.

Specifying the above relationship, it is possible to prevent interference between each pair of the turn portions 52 of the electric wires 50 which respectively protrude from one circumferentially-adjacent pair of the slots 31 of the stator core 30. Consequently, it is possible to prevent both the axial length and radial thickness of the coil end parts 42 of the stator coil 40 from being increased for preventing the above-described interference.

Furthermore, as shown in FIGS. 12A-12B, each of the turn portions 52 of the electric wires 50 further includes two shoulder parts 56 between the crank-shaped part 54 and each of the shoulder parts 55. Accordingly, each of the turn portions 52 of the electric wires 50 includes one crank-shaped part 54, two shoulder parts 55, and four shoulder parts 56. Each of the shoulder parts 56 extends, like the shoulder parts 55, perpendicular to the in-slot portions 51 (or parallel to the corresponding axial end face 30a of the stator core 30). Consequently, with the shoulder parts 56, the protruding height of each of the turn portions 52 from the corresponding axial end face 30a of the stator core 30 can be further reduced. As a result, the axial length of the coil end parts 42 of the stator coil 40 can be further reduced.

In addition, each of the turn portions 52 of the electric wires 50 can be seen as being stepped on both sides of the crank-shaped part 54 to reduce its protruding height from the corresponding axial end face 30a of the stator core 30.

In the present embodiment, the stator coil 40 is formed with the 48 electric wires 50 as shown in FIGS. 11A-11B. It should be noted that the crossover parts 70 may be omitted from some of the electric wires 50 for facilitating the formation of the U-phase, V-phase, and W-phase output terminals and the U-phase, V-phase, and W-phase neutral terminals in the stator coil 40. However, in any case, it is preferable that all of the electric wires 50 have the same shape at least between the lead portions 53a and 53b.

In forming the stator coil 40, the 48 electric wires 50 are first stacked one by one so that the longitudinal directions Y of the electric wires 50 are parallel to each other and the first in-slot portions 51A of the electric wires 50 are offset from one another in the longitudinal directions Y by one slot pitch of the stator core 30 (i.e., the circumferential distance between the centers of each adjacent pair of the slots 31 of the stator core 30). Consequently, the band-shaped electric wire assembly 45 as shown in FIGS. 13A-13B is obtained. The assembly 45 has a pair of stepped surfaces 45a that are respectively formed at opposite longitudinal ends of the assembly 45 to face in opposite directions.

In addition, in FIG. 13A, the first electric wire 50 (denoted by 50a) in the stacking of the electric wires 50 is located at the left end and the bottom of the electric wire assembly 45; the last electric wire 50 (denoted by 50b) in the stacking of the electric wires 50 is located at the right end and the top of the assembly 45.

The band-shaped electric wire assembly 45 is then rolled to have the shape of a hollow cylinder with a constant radial thickness in the circumferential direction. More specifically, as shown in FIG. 13A, the band-shaped electric wire assembly 45 is rolled from the left end in the counterclockwise direction Z, bringing the two stepped surfaces 45a into complete contact with each other.

Figure 13C:
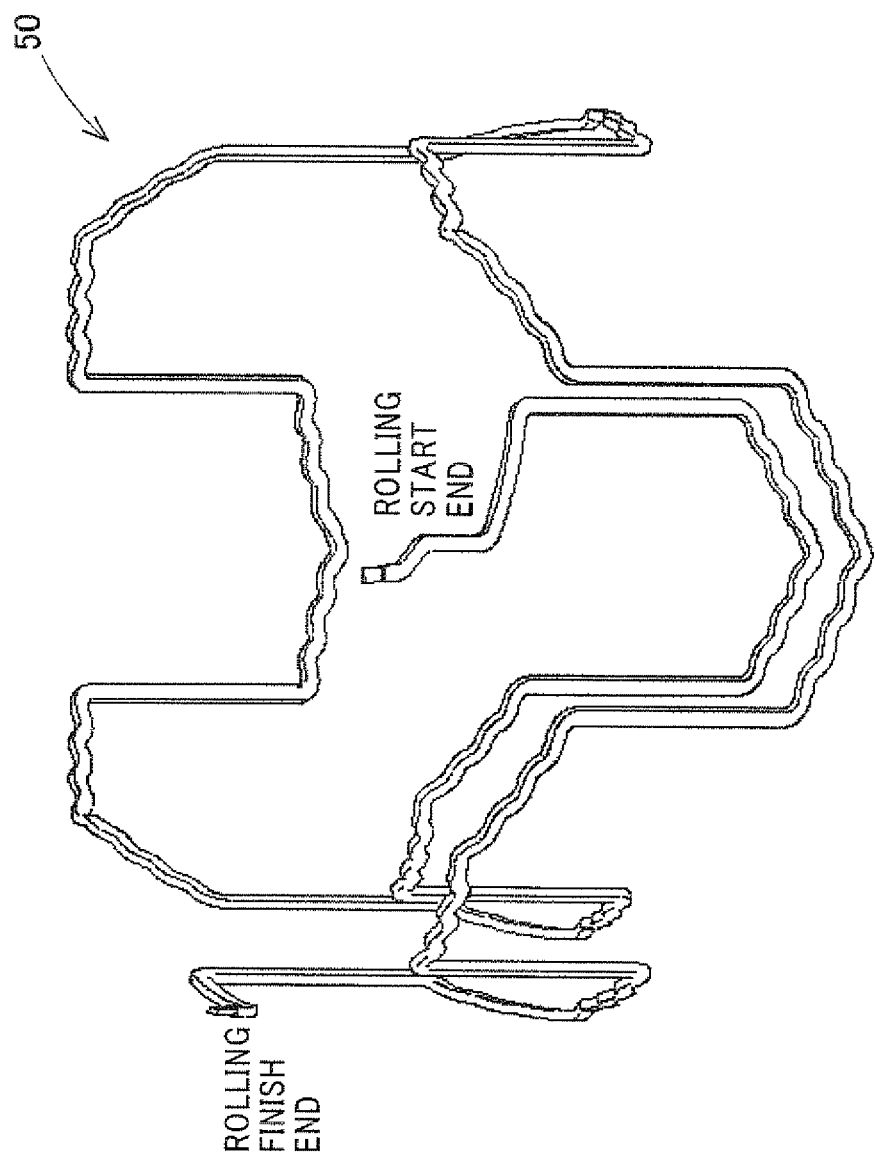
FIG. 13C is a perspective view illustrating one of the electric wires in the electric wire assembly after the electric wire assembly is rolled into a hollow cylindrical shape.

Consequently, as shown in FIG. 13C, each of the electric wires 50 included in the assembly 45 is rolled by about one and a half turns into a spiral shape. Accordingly, in the finally-obtained stator 20, when viewed along the longitudinal axis O of the stator core 30, each of the electric wires 50 spirally extends around the axis O of the stator core 30 (see FIG. 16).

Thereafter, corresponding pairs of the lead portions 53a and 53b of the electric wires 50 are joined together by, for example, welding. The manner of joining the corresponding pairs of the lead portions 53a and 53b will be described in detail later.

As a result, the stator coil 40 as shown in FIGS. 6-9 is obtained.

In the stator coil 40, those of the turn portions 52 of the electric wires 50 which are located most radially outward do not protrude radially outward from those of the in-slot portions 51 of the electric wires 50 which are located most radially outward in the slots 31 of the stator core 30. Consequently, the outside diameter of the coil end parts 42 of the stator coil 40 can be limited.

Figure 6:
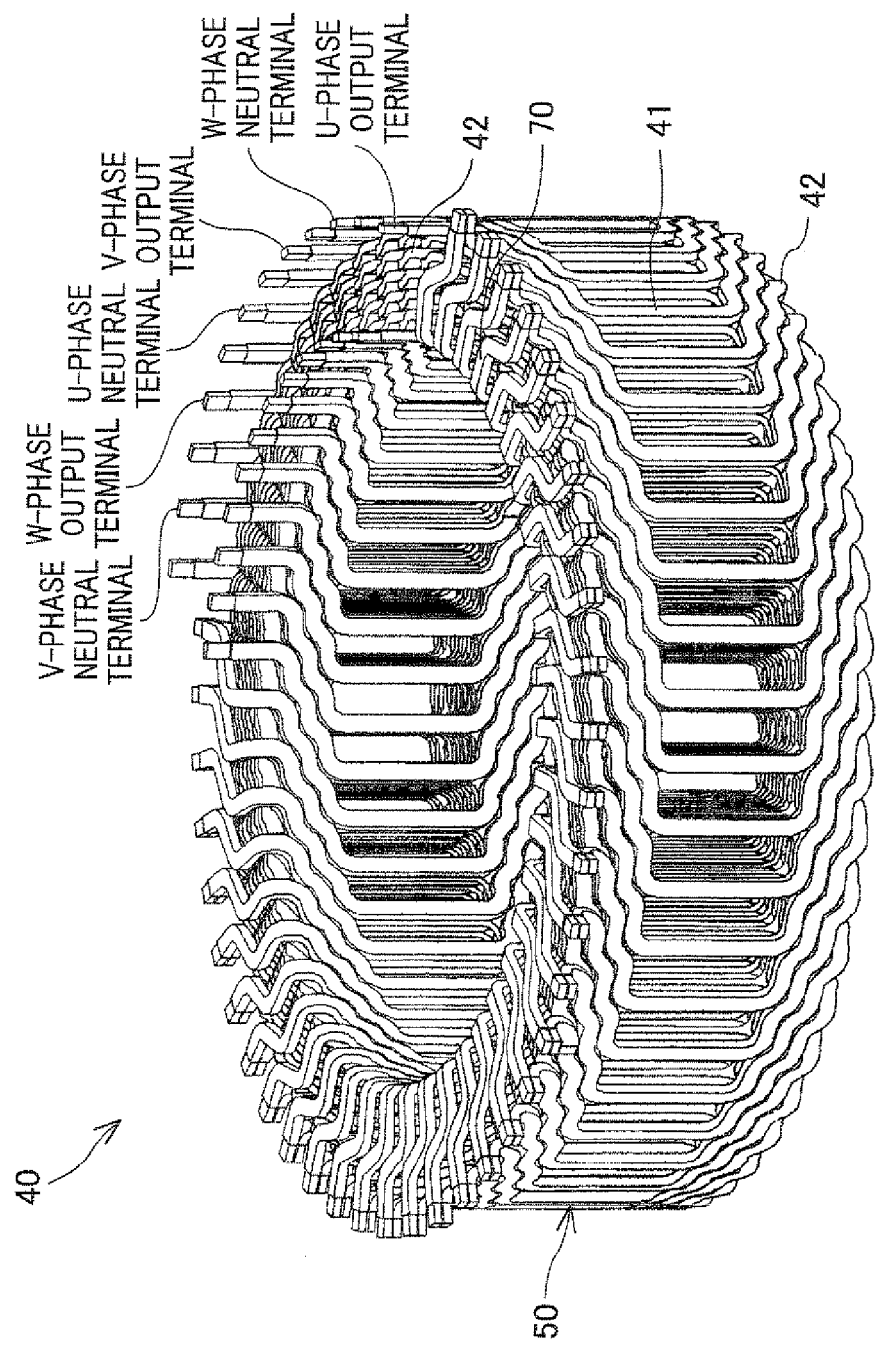
FIG. 6 is a perspective view of a stator coil of the stator.
Figure 7:
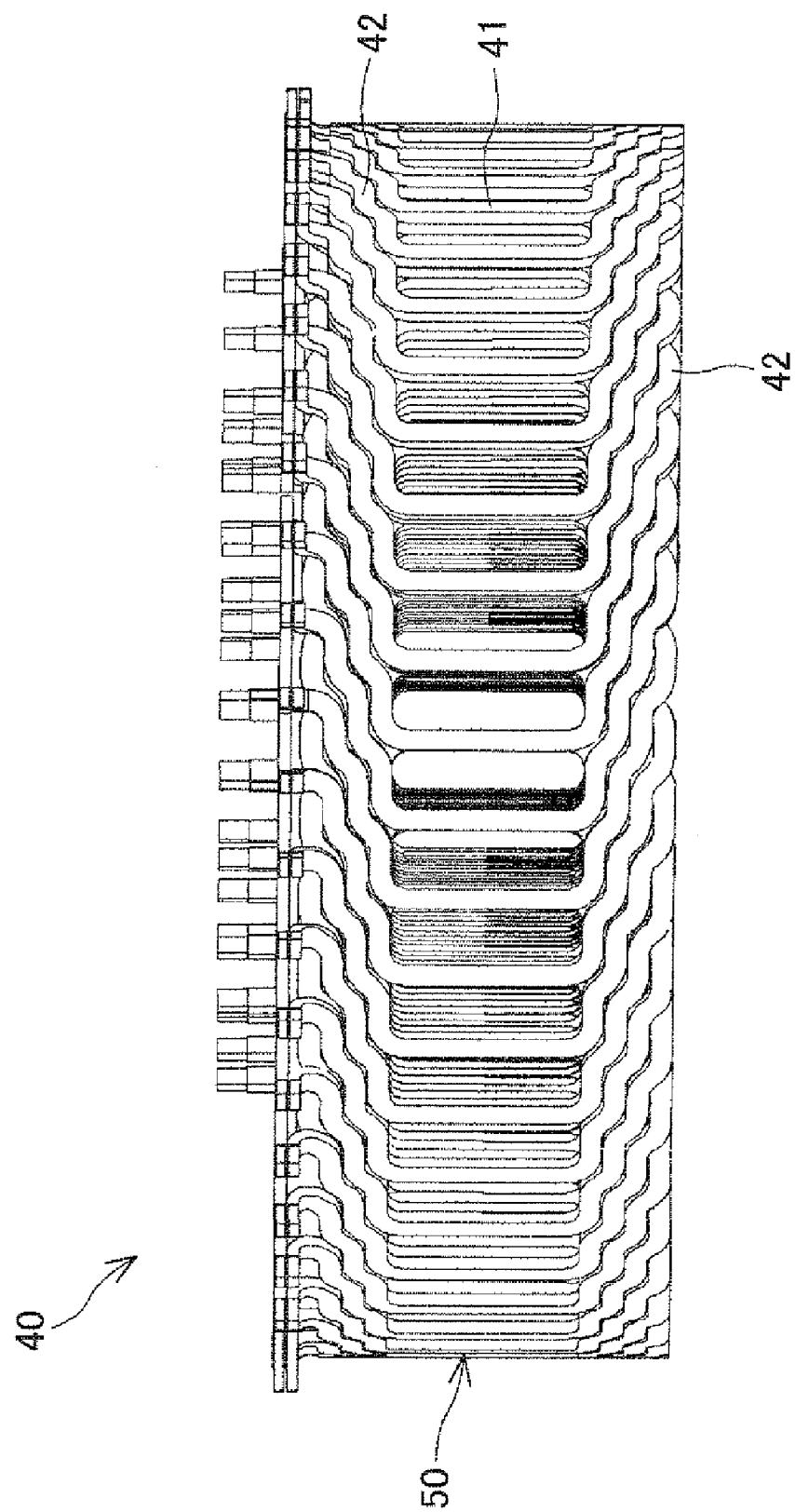
FIG. 7 is a side view of the stator coil.

As described previously, each of the turn portions 52 of the electric wires 50 includes, substantially at the center thereof, the crank-shaped part 54 by which the turn potion 52 is radially offset by the radial thickness of the in-slot portions 51. Accordingly, for each of the electric wires 50, the difference in radial position between each adjacent pair of the in-slot portions 51, which are connected by a corresponding one of the turn portions 52, is equal to the radial thickness of the in-slot portions 51. Moreover, for each of the electric wires 50, the first in-slot portion 51A is located most radially outward while the twelfth in-slot portion 51L is located most radially inward; the predetermined pitches X between the in-slot portions 51A-51L gradually decrease in a direction from the first in-slot portion 51A to the twelfth in-slot portion 51L (see FIG. 11B). Consequently, those of the in-slot portions 51 of the electric wires 50 which are stacked in a radial direction of the stator coil 40 (or a radial direction of the stator core 30) can be aligned straight in the radial direction, thereby allowing the stator coil 40 to have a substantially perfect hollow-cylindrical shape as shown in FIGS. 6 and 7.

Furthermore, all of the ith in-slot portions 51 of the 48 electric wires 50 are located respectively in the 48 slots 31 of the stator core 30 at the same radial position, where i=1, 2, . . . , 12. For example, all of the first in-slot portions 51A of the 48 electric wires 50 are located respectively in the 48 slots 31 and positioned most radially outward in the respective slots 31; all of the twelfth in-slot portions 51L of the 48 electric wires 50 are located respectively in the 48 slots 31 and positioned most radially inward in the respective slots 31. With the above location of the in-slot portions 51 of the electric wires 50, both the outside and inside diameters of the stator coil 40 can be made uniform in the circumferential direction of the stator core 30.

In the present embodiment, as shown in FIG. 14, the stator coil 40 is formed as a three-phase coil which is comprised of three phase windings (i.e., U-phase, V-phase, and W-phase windings) 43. Each of the U-phase, V-phase, and W-phase windings 43 is formed by serially connecting 16 electric wires 50. Further, the U-phase output and neutral terminals are respectively formed at the opposite ends of the U-phase winding 43; the V-phase output and neutral terminals are respectively formed at the opposite ends of the V-phase winding 43; and the W-phase output and neutral terminals are respectively formed at the opposite ends of the W-phase winding 43. Furthermore, the U-phase, V-phase, and W-phase windings 43 are Y-connected to define a neutral point therebetween. That is, the U-phase, V-phase, and W-phase neutral terminals of the U-phase, V-phase, and W-phase windings 43 are joined together at the neutral point. Consequently, three-phase AC power is input to or output from the stator coil 40 via the U-phase, V-phase, and W-phase output terminals.

Figure 15:
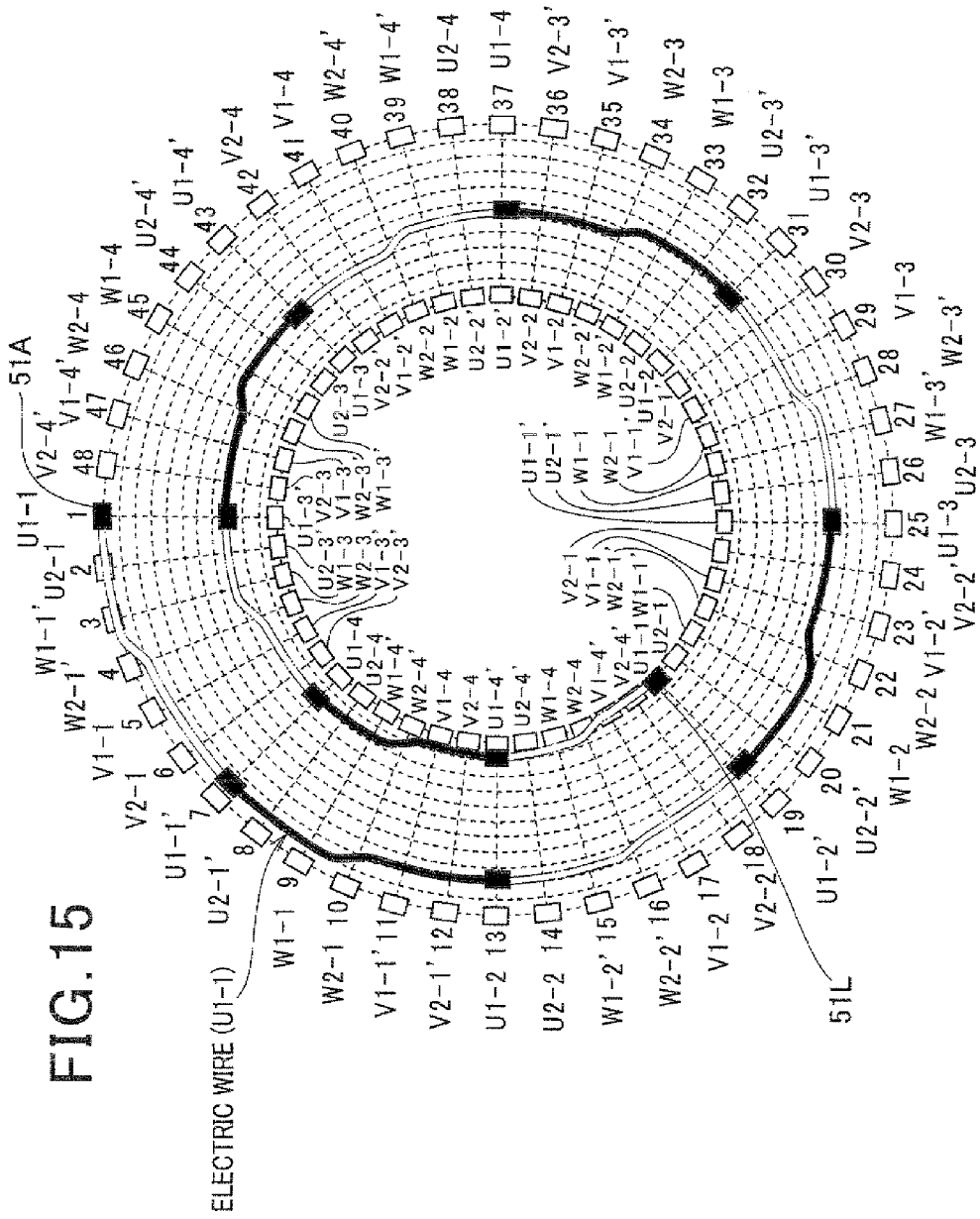
FIG. 15 is a schematic view illustrating the location of the radially-outermost in-slot portion of each of the electric wires in the stator core.
Figure 16:
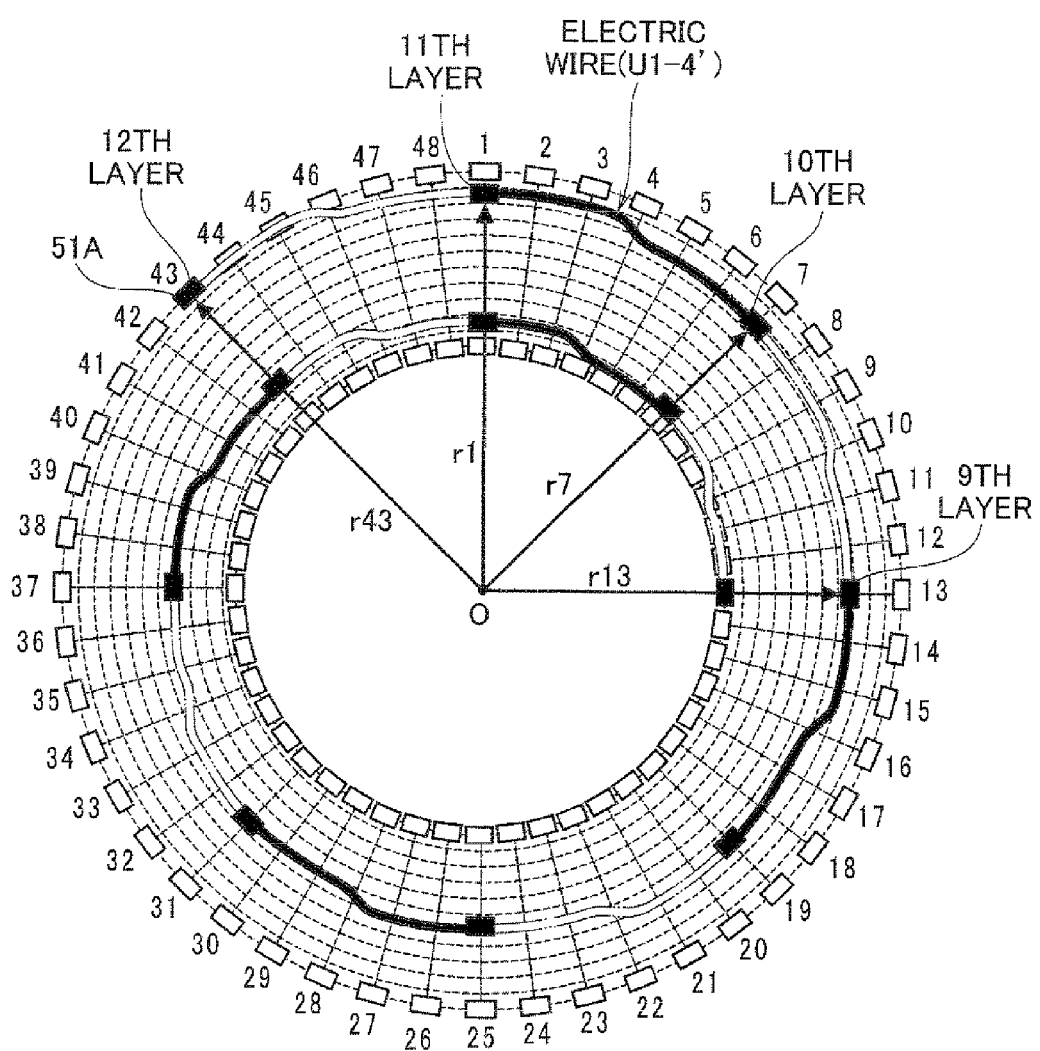
FIG. 16 is a schematic view illustrating the manner of extension of the electric wire labeled (U1-4') when viewed along the longitudinal axis O of the stator core.

In FIGS. 15 and 16, the intersections between 12 dashed-line circles and 48 radially-extending dashed lines represent the positions of the in-slot portions 51 of the electric wires 50. In addition, among the positions of the in-slot portions 51, only the radially outermost and radially innermost ones are denoted by rectangles.

It can be seen from FIGS. 15 and 16 that in the present embodiment, in each of the slots 31 of the stator core 30, the in-slot portions 51 of the electric wires 50 are radially stacked in 12 layers.

Further, in FIGS. 15 and 16, the numbers 1-48 of the slots 31 of the stator core 30 are respectively shown radially outside the 48 radially-extending dashed lines. In addition, in FIG. 15, each of the 48 electric wires 50 is labeled radially outside the slot 31 in which the first in-slot portion 51A of the electric wire 50 is located most radially outward (i.e., located at the twelfth layer in the slot 31); each of the 48 electric wires 50 is also labeled radially inside the slot 31 in which the twelfth in-slot portion 51L of the electric wire 50 is located most radially inward (i.e., located at the first layer in the slot 31).

In the present embodiment, each of the U-phase, V-phase, and W-phase windings 43 of the stator coil 40 is formed with first and second electric wire groups each consisting of eight electric wires 50. The in-slot portions 51 of the electric wires 50 of the first group are received in eight common slots 31 of the stator core 30. Similarly, the in-slot portions 51 of the electric wires 50 of the second group are also received in another eight common slots 31 of the stator core 30. That is, the in-slot portions 51 of the electric wires 50 of the first group are received in different slots 31 from the in-slot portions 51 of the electric wires 50 of the second group.

For example, the U-phase winding 43 is formed with a first electric wire group, which consists of the electric wires 50 labeled (U1-1) to (U1-4) and (U1-1') to (U1-4'), and a second electric wire group that consists of the electric wires 50 labeled (U2-1) to (U2-4) and (U2-1') to (U2-4'). The in-slot portions 51 of the (U1-1) to (U1-4) and (U1-1') to (U1-4') electric wires 50 are received in the Nos. 1, 7, 13, 19, 25, 31, 37, and 43 slots 31 of the stator core 30. On the other hand, the in-slot portions 51 of the (U2-1) to (U2-4) and (U2-1') to (U2-4') electric wires 50 are received in the Nos. 2, 8, 14, 20, 26, 32, 38, and 44 slots 31 of the stator core 30.

FIG. 15 illustrates, from one axial side of the stator core 30, the arrangement of each of the 48 electric wires 50 by taking the (U1-1) electric wire 50 as an example. Specifically, in FIG. 15, the positions of the in-slot portions 51 of the (U1-1) electric wire 50 are denoted by black rectangles; those of the turn portions 52 of the (U1-1) electric wire 50 which are located on the one axial side of the stator core 30 (i.e., on the front side of the paper surface of FIG. 15) are denoted by circumferentially-extending heavy lines; and those of the turn portions 52 of the (U1-1) electric wire 50 which are located on the other axial side of the stator core 30 (i.e., on the rear side of the paper surface of FIG. 15) are denoted by circumferentially-extending two-dot dashed lines. As seen from FIG. 15, for the (U1-1) electric wire 50, the first in-slot portion 51A is located at the twelfth layer (i.e., the radially outermost layer) in the No. 1 slot 31; the twelfth in-slot portion 51L is located at the first layer (i.e., the radially innermost layer) in the No. 19 slot 31; the first to the twelfth in-slot portions 51A-51L are circumferentially spaced at a six-slot pitch; and the radial positions of the in-slot portions 51A-51L are successively offset radially inward by one layer each time.

FIG. 16 illustrates, from the other axial side of the stator core 30, the arrangement of each of the 48 electric wires 50 by taking the (U1-4') electric wire 50 as an example. Specifically, in FIG. 16, the positions of the in-slot portions 51 of the (U1-4') electric wire 50 are denoted by black rectangles; those of the turn portions 52 of the (U1-4') electric wire 50 which are located on the other axial side of the stator core 30 (i.e., on the front side of the paper surface of FIG. 16) are denoted by circumferentially-extending heavy lines; and those of the turn portions 52 of the (U1-4') electric wire 50 which are located on the one axial side of the stator core 30 (i.e., on the rear side of the paper surface of FIG. 16) are denoted by circumferentially-extending two-dot dashed lines. As seen from FIG. 16, for the (U1-4') electric wire 50, the first in-slot portion 51A is located at the twelfth layer in the No. 43 slot 31; the twelfth in-slot portion 51L is located at the first layer in the No. 13 slot 31; the first to the twelfth in-slot portions 51A-51L are circumferentially spaced at a six-slot pitch; and the radial positions of the in-slot portions 51A-51L are successively offset by one layer each time.

As described previously, in the present embodiment, the stator core 30 has the 48 slots 31 formed therein, while the stator coil 40 is formed with the 48 electric wires 50. The electric wires 50 are mounted on the stator core 30 so that they are offset from one another in the circumferential direction of the stator core 30 by one slot pitch of the stator core 30. Consequently, the first in-slot portions 51A of the 48 electric wires 50 are respectively located at the radially outermost layers (i.e., the twelfth layers) in the 48 slots 31; the twelfth in-slot portions 51L of the 48 electric wires 50 are respectively located at the radially innermost layers (i.e., the first layers) in the 48 slots 31.

FIG. 17 shows both the label of the electric wire 50 located at the radially outermost layer and the label of the electric wire 50 located at the radially innermost layer in each of the slots 31 of the stator core 30.

In the present embodiment, for each of the 48 electric wires 50 forming the stator coil 40, the radial distances from the axis O of the stator core 30 to the in-slot portions 51 of the electric wire 50 successively decrease in the sequence from the first in-slot portion 51A to the twelfth in-slot portion 51L. Moreover, for each of the 48 electric wires 50, the difference in radial distance from the axis O of the stator core 30 between each adjacent pair of the in-slot portions 51, which are connected by a corresponding one of the turn portions 52, is equal to the radial thickness of the in-slot portions 51.

For example, referring back to FIG. 16, for the (U1-4') electric wire 50, there is satisfied the following relationship: r43>r1>r7>r13. Here, r43 represents the radial distance from the axis O of the stator core 30 to the first in-slot portion 51A that is located at the twelfth layer in the No. 43 slot 31; r1 represents the radial distance from the axis O to the second in-slot portion 51B that is located at the eleventh layer in the No. 1 slot 31; r7 represents the radial distance from the axis O to the third in-slot portion 51C that is located at the tenth layer in the No. 7 slot 31; and r13 represents the radial distance from the axis O to the fourth in-slot portion 51D that is located at the ninth layer in the No. 13 slot 31. Further, the radial distances r43, r1, r7, and r13 successively decrease in decrements of the radial thickness of the in-slot portions 51.

Figure 18:
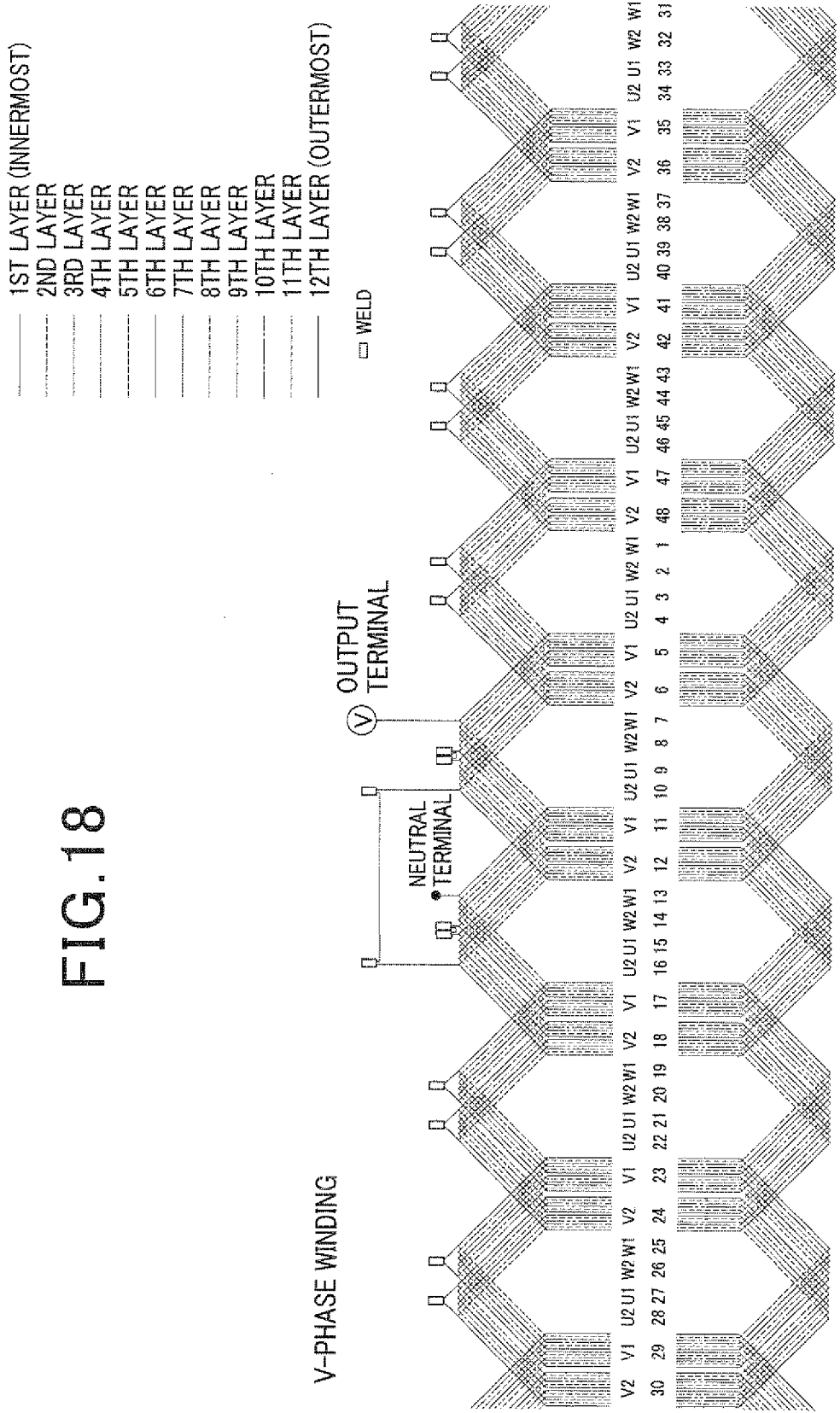
FIG. 18 is a schematic view illustrating the connection between those of the electric wires which together form a V-phase winding of the stator coil when viewed from the radially inner side of the stator core.

Next, with reference to FIGS. 14 and 17-18, the manner of serially connecting the 16 electric wires 50 for forming the V-phase winding 43 of the stator coil 40 will be described. In addition, it should be noted that the electric wires 50 for forming the U-phase and W-phase windings 43 of the stator coil 40 are also connected in the same manner as those for forming the V-phase winding 43.

As shown in FIG. 14, the V-phase winding 43 is formed by serially connecting the (V1-1) to (V1-4), (V1-1') to (V1-4'), (V2-1) to (V2-4), and (V2-1') to (V2-4') electric wires 50.

Specifically, to the V-phase output terminal, there is connected the first in-slot portion 51A-side end of the (V1-1) electric wire 50. Moreover, as shown in FIGS. 17 and 18, for the (V1-1) electric wire 50, the first in-slot portion 51A is located at the radially outermost layer (i.e., the twelfth layer) in the No. 5 slot 31 of the stator core 30, while the twelfth in-slot portion 51L is located at the radially innermost layer (i.e., the first layer) in the No. 23 slot 31.

To the twelfth in-slot portion 51L-side end of the (V1-1) electric wire 50, there is connected the first in-slot portion 51A-side end of the (V1-2) electric wire 50. Moreover, for the (V1-2) electric wire 50, the first in-slot portion 51A is located at the radially outermost layer in the No. 17 slot 31, while the twelfth in-slot portion 51L is located at the radially innermost layer in the No. 35 slot 31.

To the twelfth in-slot portion 51L-side end of the (V1-2) electric wire 50, there is connected the first in-slot portion 51A-side end of the (V1-3) electric wire 50. Moreover, for the (V1-3) electric wire 50, the first in-slot portion 51A is located at the radially outermost layer in the No. 29 slot 31, while the twelfth in-slot portion 51L is located at the radially innermost layer in the No. 47 slot 31.

To the twelfth in-slot portion 51L-side end of the (V1-3) electric wire 50, there is connected the first in-slot portion 51A-side end of the (V1-4) electric wire 50. Moreover, for the (V1-4) electric wire 50, the first in-slot portion 51A is located at the radially outermost layer in the No. 41 slot 31, while the twelfth in-slot portion 51L is located at the radially innermost layer in the No. 11 slot 31.

To the twelfth in-slot portion 51L-side end of the (V1-4) electric wire 50, there is connected the first in-slot portion 51A-side end of the (V2-1) electric wire 50. Moreover, for the (V2-1) electric wire 50, the first in-slot portion 51A is located at the radially outermost layer in the No. 6 slot 31, while the twelfth in-slot portion 51L is located at the radially innermost layer in the No. 24 slot 31.

To the twelfth in-slot portion 51L-side end of the (V2-1) electric wire 50, there is connected the first in-slot portion 51A-side end of the (V2-2) electric wire 50. Moreover, for the (V2-2) electric wire 50, the first in-slot portion 51A is located at the radially outermost layer in the No. 18 slot 31, while the twelfth in-slot portion 51L is located at the radially innermost layer in the No. 36 slot 31.

To the twelfth in-slot portion 51L-side end of the (V2-2) electric wire 50, there is connected the first in-slot portion 51A-side end of the (V2-3) electric wire 50. Moreover, for the (V2-3) electric wire 50, the first in-slot portion 51A is located at the radially outermost layer in the No. 30 slot 31, while the twelfth in-slot portion 51L is located at the radially innermost layer in the No. 48 slot 31.

To the twelfth in-slot portion 51L-side end of the (V2-3) electric wire 50, there is connected the first in-slot portion 51A-side end of the (V2-4) electric wire 50. Moreover, for the (V2-4) electric wire 50, the first in-slot portion 51A is located at the radially outermost layer in the No. 42 slot 31, while the twelfth in-slot portion 51L is located at the radially innermost layer in the No. 12 slot 31.

To the twelfth in-slot portion 51L-side end of the (V2-4) electric wire 50, there is connected the twelfth in-slot portion 51L-side end of the (V2-4') electric wire 50. Moreover, for the (V2-4') electric wire 50, the first in-slot portion 51A is located at the radially outermost layer in the No. 48 slot 31, while the twelfth in-slot portion 51L is located at the radially innermost layer in the No. 18 slot 31.

To the first in-slot portion 51A-side end of the (V2-4') electric wire 50, there is connected the twelfth in-slot portion 51L-side end of the (V2-3') electric wire 50. Moreover, for the (V2-3') electric wire 50, the first in-slot portion 51A is located at the radially outermost layer in the No. 36 slot 31, while the twelfth in-slot portion 51L is located at the radially innermost layer in the No. 6 slot 31.

To the first in-slot portion 51A-side end of the (V2-3') electric wire 50, there is connected the twelfth in-slot portion 51L-side end of the (V2-2') electric wire 50. Moreover, for the (V2-2') electric wire 50, the first in-slot portion 51A is located at the radially outermost layer in the No. 24 slot 31, while the twelfth in-slot portion 51L is located at the radially innermost layer in the No. 42 slot 31.

To the first in-slot portion 51A-side end of the (V2-2') electric wire 50, there is connected the twelfth in-slot portion 51L-side end of the (V2-1') electric wire 50. Moreover, for the (V2-1') electric wire 50, the first in-slot portion 51A is located at the radially outermost layer in the No. 12 slot 31, while the twelfth in-slot portion 51L is located at the radially innermost layer in the No. 30 slot 31.

To the first in-slot portion 51A-side end of the (V2-1') electric wire 50, there is connected the twelfth in-slot portion 51L-side end of the (V1-4') electric wire 50. Moreover, for the (V1-4') electric wire 50, the first in-slot portion 51A is located at the radially outermost layer in the No. 47 slot 31, while the twelfth in-slot portion 51L is located at the radially innermost layer in the No. 17 slot 31.

To the first in-slot portion 51A-side end of the (V1-4') electric wire 50, there is connected the twelfth in-slot portion 51L-side end of the (V1-3') electric wire 50. Moreover, for the (V1-3') electric wire 50, the first in-slot portion 51A is located at the radially outermost layer in the No. 35 slot 31, while the twelfth in-slot portion 51L is located at the radially innermost layer in the No. 5 slot 31.

To the first in-slot portion 51A-side end of the (V1-3') electric wire 50, there is connected the twelfth in-slot portion 51L-side end of the (V1-2') electric wire 50. Moreover, for the (V1-2') electric wire 50, the first in-slot portion 51A is located at the radially outermost layer in the No. 23 slot 31, while the twelfth in-slot portion 51L is located at the radially innermost layer in the No. 41 slot 31.

To the first in-slot portion 51A-side end of the (V1-2') electric wire 50, there is connected the twelfth in-slot portion 51L-side end of the (V1-1') electric wire 50. Moreover, for the (V1-1') electric wire 50, the first in-slot portion 51A is located at the radially outermost layer in the No. 11 slot 31, while the twelfth in-slot portion 51L is located at the radially innermost layer in the No. 29 slot 31. In addition, the first in-slot portion 51A-side end of the (V1-1') electric wire 50 is connected to the V-phase neutral terminal of the stator coil 40.

Further, as described previously, each of the electric wires 50 has the lead portion 53a formed at the first in-slot portion 51A-side end thereof and the lead portion 53b formed at the twelfth in-slot portion 51L-side end thereof (see FIGS. 11A-11B). The lead portion 53a is connected to the first in-slot portion 51A via the half-turn portion 52M, and the lead portion 53b is connected to the twelfth in-slot portion 51L via the half-turn portion 52N. The lead portion 53b also has the crossover part 70 formed therein. In the present embodiment, the connection between the electric wires 50 is made by joining corresponding pairs of the lead portions 53a and 53b of the electric wires 50.

Hereinafter, the manner, according to the present embodiment, of joining the corresponding pairs of the lead portions 53a and 53b of the electric wires 50 will be described by taking the pair of (V1-1) and (V1-2) electric wires 50 as an example.

Referring again to FIGS. 17-18, the (V1-1) electric wire 50 has the first in-slot portion 51A located at the radially outermost layer in the No. 5 slot 31 of the stator core 30 and the twelfth in-slot portion 51L located at the radially innermost layer in the No. 23 slot 31. The lead portion 53b of the (V1-1) electric wire 50 is offset, by the length of the half-turn portion 52N in the circumferential direction of the stator core 30, from the No. 23 slot 31 to the vicinity of the No. 20 slot 31.

On the other hand, the (V1-2) electric wire 50 has the first in-slot portion 51A located at the radially outermost layer in the No. 17 slot 31 and the twelfth in-slot portion 51L located at the radially innermost layer in the No. 35 slot 31. The lead portion 53a of the (V1-2) electric wire 50 is offset, by the length of the half-turn portion 52M in the circumferential direction of the stator core 30, from the No. 17 slot 31 to the vicinity of the No. 20 slot 31.

Figure 19:
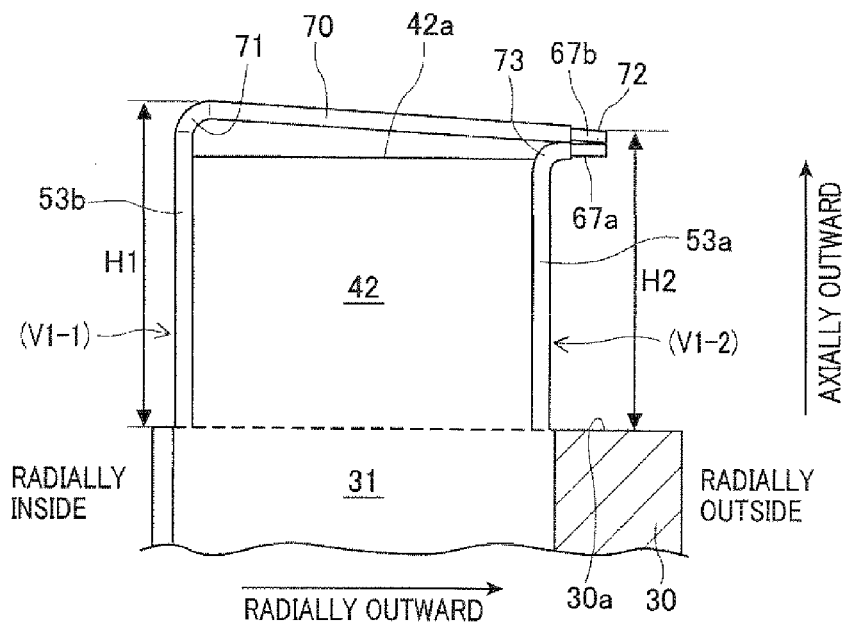
FIG. 19 is a schematic view illustrating the manner of joining a pair of the electric wires according to the embodiment.
Figure 20:
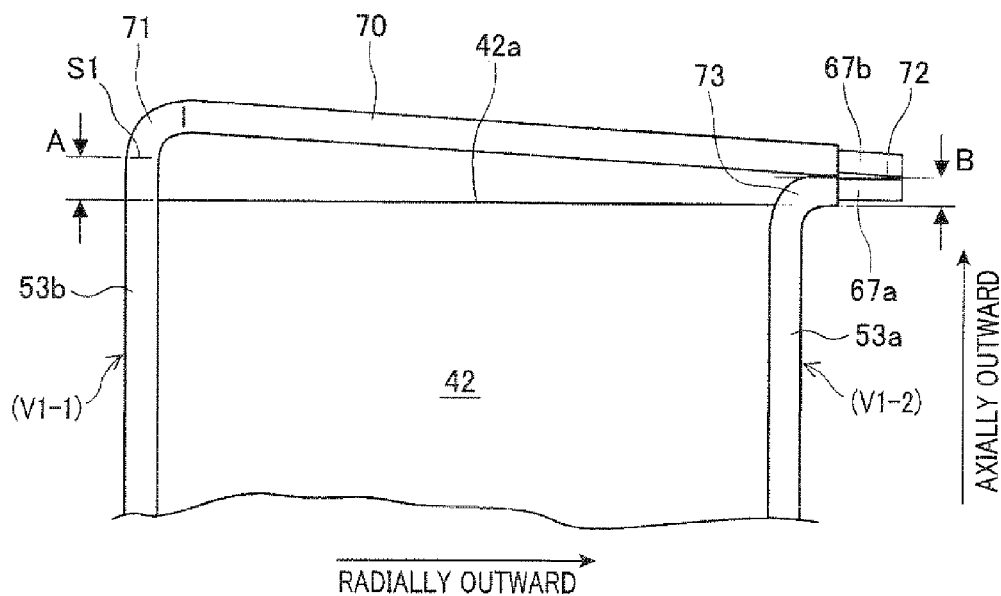
FIG. 20 is an enlarged schematic view showing part of FIG. 19.
Figure 21:
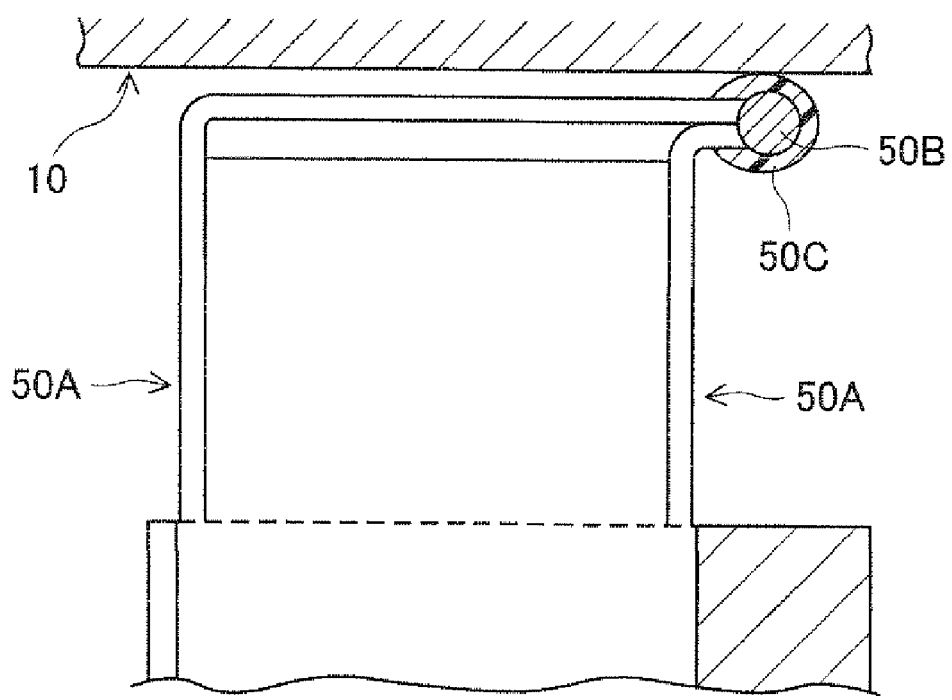
FIG. 21 is a schematic view illustrating a manner of joining a pair of electric wires according to the prior art.

Referring further to FIGS. 19-20, the lead portion 53b of the (V1-1) electric wire 50 is bent radially outward to extend from the radially inner periphery of the stator coil 40 to the lead portion 53a of the (V1-2) electric wire 50 which is located on the radially outer periphery of the stator coil 40; then, the lead portion 53b of the (V1-1) electric wire 50 is welded to the lead portion 53a of the (V1-2) electric wire 50. In other words, the twelfth in-slot portion 51L-side end of the (V1-1) electric wire 50 is joined to the first in-slot portion 51A-side end of the (V1-2) electric wire 50 by welding. In addition, the lead portion 53b of the (V1-1) electric wire 50 includes the crossover part 70 that crosses over the annular axial end face 42a of the coil end part 42 of the stator coil 40 from the radially inside to the radially outside of the axial end face 42a.

Moreover, in the present embodiment, the lead portion 53b of the (V1-1) electric wire 50 includes a stripped portion 67b that is formed by striping the insulating coat 68 off the electric conductor 67 for a predetermined length from the distal end of the lead portion 53b. Similarly, the lead portion 53a of the (V1-2) electric wire 50 includes a stripped portion 67a that is formed by stripping the insulating coat 68 off the electric conductor 67 for a predetermined length from the distal end of the lead portion 53a. The stripped portion 67b of the lead portion 53b of the (V1-1) electric wire 50 is welded to the stripped portion 67a of the lead portion 53a of the (V1-2) electric wire 50, forming a joint (i.e., weld) 72 therebetween.

More specifically, in the present embodiment, the lead portion 53b of the (V1-1) electric wire 50 includes a bent part 71, at which the lead portion 53b is bent radially outward, and the crossover part 70 that adjoins the bent part 71 and has the stripped portion 67b formed at the radially outer end thereof.

The bent part 71 is positioned away from the axial end face 42a of the coil end part 42 of the stator coil 40 by a predetermined distance A. In other words, a bending-start end S1 of the bent part 71 is positioned more axially outward (i.e., more upward in FIGS. 19-20) than the axial end face 42a of the coil end part 42 by the distance A. Consequently, the bent part 71 is prevented from interfering with a corner portion of the coil end part 42 which connects the axial end face 42 and the radially inner surface of the coil end part 42.

The crossover part 70 extends obliquely with respect to the axial end face 30a of the stator core 30 so that the joint 72-side end (i.e., the radially outer end) of the crossover part 70 is located closer to the axial end face 30a than the bent part 71-side end (i.e., the radially inner end) of the crossover part 70 is. Further, the joint 72-side end of the crossover part 70 is positioned more axially outward (i.e., more upward in FIGS. 19-20) than the axial end face 42a of the coil end part 42 by a predetermined distance B that is shorter than the predetermined distance A. In other words, between the joint 72-side end of the crossover part 70 and the axial end face 42a of the coil end part 42, there is provided a clearance of B.

Consequently, the joint 72 between the stripped portion 67b of the (V1-1) electric wire 50 and the stripped portion 67a of the (V1-2) electric wire 50 is positioned closer to the axial end face 30a of the stator core 30 than the crossover part 70 of the (V1-1) electric wire 50 is. More particularly, in the axial direction of the stator core 30, the distance H2 between the joint 72 and the axial end face 30a of the stator core 30 is shorter than the maximum distance H1 between the crossover part 70 and the axial end face 30a.

Furthermore, in the present embodiment, the lead portion 53a of the (V1-2) electric wire 50, which protrudes axially outward from the axial end face 30a of the stator core 30, is bent radially outward at a substantially right angle to form a bent part 73. The bent part 73 is positioned to adjoin the stripped portion 67a of the (V1-2) electric wire 50.

With the bent part 73, it becomes possible to align the stripped portion 67a of the (V1-2) electric wire 50 with the stripped portion 67b of the (V1-1) electric wire 50 in the axial direction of the stator core 30. Further, the stripped portion 67a of the (V1-2) electric wire 50 extends in the radial direction of the stator core 30, while the stripped portion 67b of the (V1-1) electric wire 50 extends obliquely with respect to the radial direction. Consequently, the strip portions 67a and 67b of the (V1-2) and (V1-1) electric wires 50 are brought into contact with each other only at the distal ends thereof; then, they are joined together by, for example, TIG (Tungsten Inert Gas) welding to form the joint 72 therebetween.

In addition, after joining the strip portions 67a and 67b of the (V1-2) and (V1-1) electric wires 50 together, an insulating material (e.g., a powder resin) is applied to form an insulating layer (not shown) that covers both the strip portions 67a and 67b and the joint 72 therebetween.

Moreover, in the present embodiment, the strip portions 67a and 67b of the (V1-2) and (V1-1) electric wires 50 are welded radially outside the radially outermost turn portions 52 of the electric wires 50. To this end, the lead portion 53b of the (V1-1) electric wire 50 is configured to include the crossover part 70 that crosses over the annular axial end face of the stator coil 40 (more specifically, the annular axial end face 42a of the coil end part 42 of the stator coil 40 which is comprised of the turn portions 52 of the electric wires 50) from the radially inside to the radially outside of the axial end face. Consequently, it is possible to reliably prevent the twelfth in-slot portion 51L of the (V1-1) electric wire 50, which is located at the radially innermost layer in the No. 23 slot 31, from protruding radially inward. As a result, it is possible to reliably prevent the (V1-1) electric wire 50 from interfering with the rotor of the electric rotating machine which is located radially inside the stator 20.

In the above-described manner, all of the corresponding pairs of the lead portions 53a and 53b of the electric wires 50 are joined and thereby electrically connected together.

Figure 8:
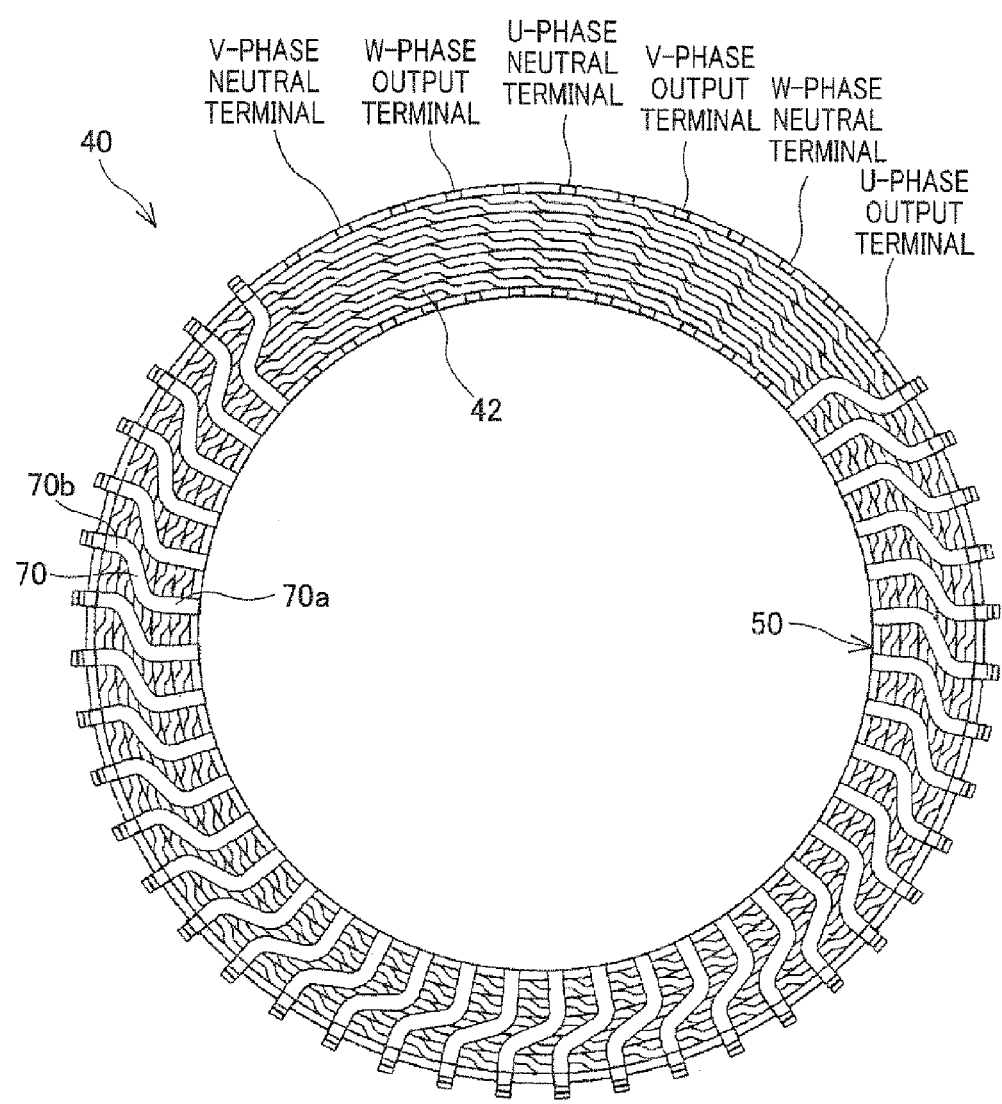
FIG. 8 is a top view of the stator coil.
Figure 9:
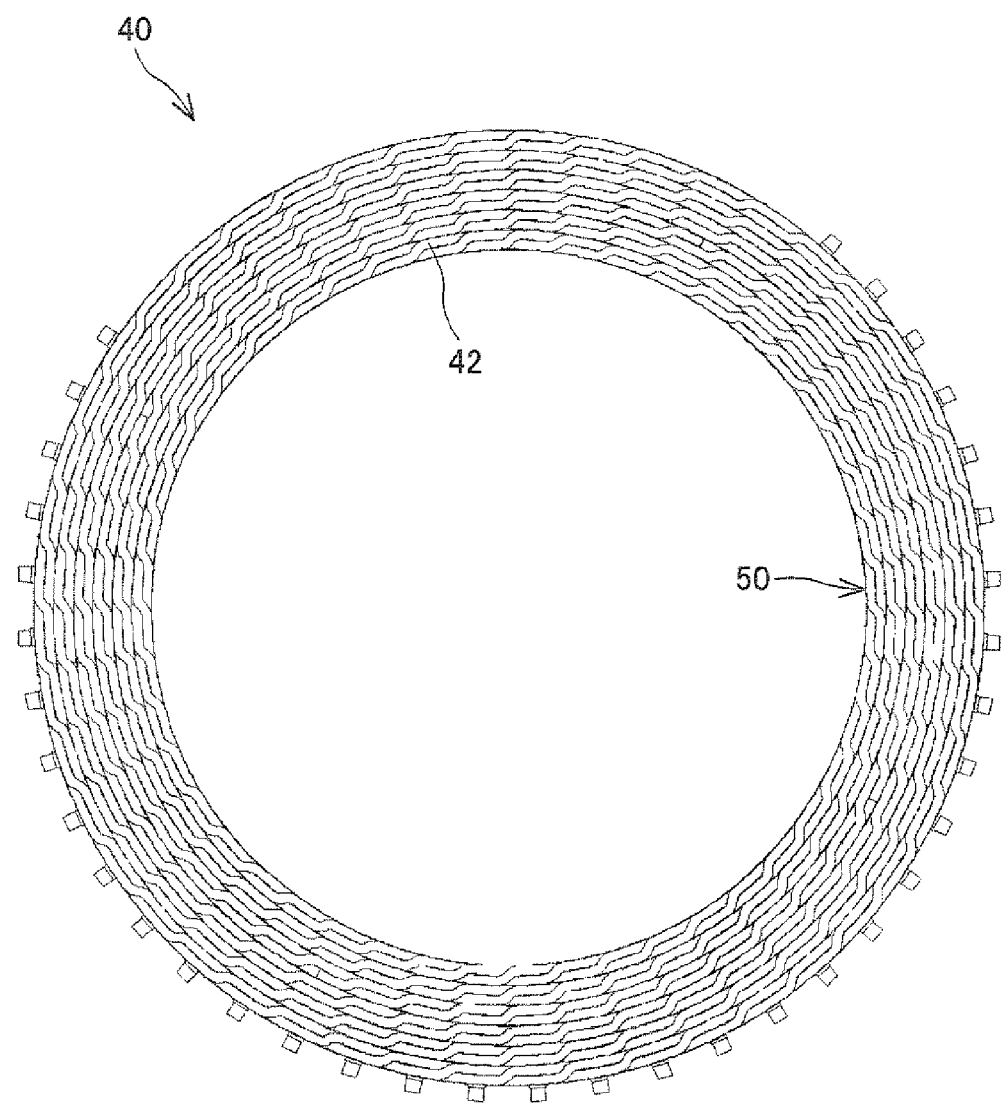
FIG. 9 is a bottom view of the stator coil.

In addition, in the present embodiment, as shown in FIG. 8, each of the crossover parts 70 of the electric wires 50 is crank-shaped to include a pair of radially-extending end sections 70a and 70b. With such a shape, it is possible to facilitate the bending of the lead portions 53b of the electric wires 50 for forming the crossover parts 70 and the welding of the corresponding pairs of the lead portions 53a and 53b of the electric wires 50.

Moreover, as shown in FIGS. 6 and 8, on the annular axial end face of the stator coil 40, the crossover parts 70 occupy substantially ¾ of the full angular range of the axial end face; the full angular range is 360°. Further, within the remaining ¼ of the full angular range, there are sequentially arranged the V-phase neutral terminal, the W-phase output terminal, the U-phase neutral terminal, the V-phase output terminal, the W-phase neutral terminal, and the U-phase output terminal of the stator coil 40. That is, on the axial end face of the stator coil 40, the U-phase, V-phase, and W-phase output terminals are arranged in the same angular range as the U-phase, V-phase, and W-phase neutral terminals; the crossover parts 70 are arranged in a different angular range from the U-phase, V-phase, and W-phase output terminals and the U-phase, V-phase, and W-phase neutral terminals.

The stator core 30 is assembled to the above-described stator coil 40 by inserting the tooth portions 33 of the stator core segments 32 into the spaces formed between the stacks of the in-slot portions 51 of the electric wires 50 from the radially outside of the stator coil 40. Consequently, each of the in-slot portions 51 of the electric wires 50 forming the stator coil 40 is received in a corresponding one of the slots 31 of the stator core 30. More specifically, for each of the electric wires 50, each adjacent pair of the in-slot portions 51 are respectively received in a corresponding pair of the slots 31 of the stator core 30 which are circumferentially spaced at a six-slot pitch. Moreover, each of the turn portions 52, which connects a corresponding adjacent pair of the in-slot portions 51, protrudes from a corresponding one of the axial end faces 30a of the stator core 30.

The above-described stator 20 according to the present embodiment has the following advantages.

In the present embodiment, the stator 20 includes the hollow cylindrical stator core 30 and the three-phase stator coil 40. The stator core 30 has the 48 slots 31 that are formed in the radially inner surface of the stator core 30 and spaced in the circumferential direction of the stator core 30. The stator coil 40 is formed of the 48 electric wires 50 mounted on the stator core 30. The electric wires 50 forming the stator coil 40 include a plurality of joined pairs of the electric wires 50, such as the pair of (V1-1) and (V1-2) electric wires 50. As described in detail above, the (V1-1) electric wire 50 has the lead portion 53b that is led out from the radially inner periphery of the No. 23 slot 31 of the stator core 30 and includes the crossover part 70. The crossover part 70 crosses over the axial end face 42a of the coil end part 42 of the stator coil 40 from the radially inside to the radially outside of the axial end face 42a. The coil end part 42 of the stator coil 40 protrudes from the axial end face 30a of the stator core 30. On the other hand, the (V1-2) electric wire 50 has the lead portion 53a that is led out from the radially outer periphery of No. 17 slot 31 of the stator core 30. The lead portion 53b of the (V1-1) electric wire 50 is joined to the lead portion 53a of the (V1-2) electric wire 50, forming the joint 72 therebetween. The joint 72 is positioned closer to the axial end face 30a of the stator core 30 than the crossover part 70 of the lead portion 53b of the (V1-1) electric wire 50 is. More particularly, in the axial direction of the stator core 30, the distance H2 between the joint 72 and the axial end face 30a of the stator core 30 is shorter than the maximum distance H1 between the crossover part 70 and the axial end face 30a.

With the above configuration, when the stator 20 is received in a housing of the electric rotating machine, the joint 72 will not interfere with the inner surface of the housing because the inner surface will first interfere with the crossover part 70. Consequently, the insulating layer covering the joint 72, which is formed after the joining of the (V1-1) and (V1-2) electric wires 50, is prevented from being peeled off from the joint 72, thereby ensuring electrical insulation of the joint 72.

Moreover, in the present embodiment, the lead portion 53b of the (V1-1) electric wire 50 further includes the bent part 71 which adjoins the crossover part 70 and at which the lead portion 53b is bent radially outward.

With the above configuration, it becomes possible to locate the joint 72 between the (V1-1) and (V1-2) electric wires 50 radially outside the slots 31 of the stator core 30, thereby preventing the joint 72 from interfering with the rotor of the electric rotating machine which is located radially inside the stator 20.

Further, in the present embodiment, the bending-start end S1 of the bent part 71 is positioned more axially outward than the axial end face 42a of the coil end part 42 of the stator coil 40 by the predetermined distance A.

With the above position, it becomes possible to prevent the bent part 71 from interfering with the corner portion of the coil end part 42 which connects the axial end face 42 and the radially inner surface of the coil end part 42. Consequently, no stress will be caused in the insulating coat 68 of the (V1-1) electric wire 50 by the corner portion; the (V1-1) electric wire 50 is prevented from being protruded radially inward by the corner portion.

In the present embodiment, the crossover part 70 of the lead portion 53b of the (V1-1) electric wire 50 extends obliquely with respect to the axial end face 30a of the stator core 30 so that the joint 72-side end of the crossover part 70 is located closer to the axial end face 30a than the bent part 71-side end of the crossover part 70 is.

With the above configuration, during the welding of the (V1-1) and (V1-2) electric wires 50, the melted metal materials of the electric wires 50 can be easily concentrated to form the joint 72.

Further, in the present embodiment, the joint 72-side end of the crossover part 70 is positioned more axially outward than the axial end face 42a of the coil end part 42 of the stator coil 40 by the predetermined distance B.

With the above position, it is possible to secure a sufficiently long creepage distance between the joint 72 and the stator core 30, thereby preventing tracking (or puncture) from occurring in the (V1-2) electric wire 50.

While the above particular embodiment of the present invention has been shown and described, it will be understood by those skilled in the art that various modifications, changes, and improvements may be made without departing from the spirit of the invention.

What is claimed is:

1. A stator for an electric rotating machine, the stator comprising:
a hollow cylindrical stator core having a plurality of slots that are formed in a radially inner surface of the stator core and spaced in a circumferential direction of the stator core; and
a stator coil comprised of a plurality of electric wires mounted on the stator core,
wherein
the plurality of electric wires comprise a joined pair of first and second electric wires,
the first electric wire has a lead portion that is led out from a radially inner periphery of a first one of the slots of the stator core and includes a crossover part, the crossover part crossing over an axial end face of an end part of the stator coil from the radially inside to the radially outside of the axial end face, the end part of the stator coil protruding from an axial end face of the stator core,
the second electric wire has a lead portion that is led out from a radially outer periphery of a second one of the slots of the stator core,
the lead portions of the first and second electric wires are joined together with a joint formed therebetween, and
the joint is positioned closer to the axial end face of the stator core than at least a potion of the crossover part of the lead portion of the first electric wire is.

2. The stator as set forth in claim 1, wherein a distance between the joint and the axial end face of the stator core in an axial direction of the stator core is shorter than a maximum distance between the crossover part and the axial end face of the stator core in the axial direction.

3. The stator as set forth in claim 1, wherein the lead portion of the first electric wire further includes a bent part which adjoins the crossover part and at which the lead portion is bent radially outward.

4. The stator as set forth in claim 3, wherein a bending-start end of the bent part is positioned more axially outward than the axial end face of the end part of the stator coil by a first predetermined distance.

5. The stator as set forth in claim 4, wherein the joint-side end of the crossover part is positioned more axially outward than the axial end face of the end part of the stator coil by a second predetermined distance.

6. The stator as set forth in claim 5, wherein the second predetermined distance is smaller than the first predetermined distance.

7. The stator as set forth in claim 3, wherein the crossover part of the lead portion of the first electric wire extends obliquely with respect to the axial end face of the stator core so that a joint-side end of the crossover part is located closer to the axial end face of the stator core than a bent part-side end of the crossover part is.

8. A stator for an electric rotating machine, the stator comprising:
a hollow cylindrical stator core having a plurality of slots that are formed in a radially inner surface of the stator core and spaced in a circumferential direction of the stator core; and
a stator coil comprised of a plurality of electric wires mounted on the stator core,
wherein
the plurality of electric wires comprise a joined pair of first and second electric wires,
the first electric wire has a lead portion that is led out from a radially inner periphery of a first one of the slots of the stator core and includes a crossover part that extends radially outward across an axial end face of the stator coil, a radially inward portion of the crossover part being located further away from the axial end face of the stator coil than a radially outward portion of the crossover part,
the second electric wire has a lead portion that is led out from a radially outer periphery of a second one of the slots of the stator core, and
the lead portions of the first and second electric wires are joined together.

9. The stator as set forth in claim 8, wherein the lead portion of the first electric wire further includes a bent part which adjoins the radially inward portion of the crossover part and at which the lead portion is bent radially outward.

10. The stator as set forth in claim 9, wherein a bending-start end of the bent part is positioned axially outward from the axial end face of the stator coil by a first predetermined distance, wherein the radially outward portion of the crossover part is positioned axially outward from the axial end face of the stator coil by a second predetermined distance, and wherein the first distance is greater than the second distance.

* * * * *